United States Patent
Adriaens et al.

(10) Patent No.: US 9,313,274 B2
(45) Date of Patent: Apr. 12, 2016

(54) ISOLATING CLIENTS OF DISTRIBUTED STORAGE SYSTEMS

(71) Applicant: Google Inc., Mountain View, CA (US)

(72) Inventors: Jacob Thomas Adriaens, Madison, WI (US); Kyle Nesbit, Madison, WI (US); Scott Robert Finley, Verona, WI (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 14/018,602

(22) Filed: Sep. 5, 2013

(65) Prior Publication Data

US 2015/0067086 A1   Mar. 5, 2015

(51) Int. Cl.
  H04L 29/08   (2006.01)
  H04L 29/06   (2006.01)
  H04L 12/911  (2013.01)
  G06F 17/30   (2006.01)
  H04L 12/815  (2013.01)

(52) U.S. Cl.
  CPC ...... *H04L 67/1097* (2013.01); *G06F 17/30194* (2013.01); *H04L 47/22* (2013.01); *H04L 47/70* (2013.01); *H04L 63/02* (2013.01); *H04L 63/101* (2013.01)

(58) Field of Classification Search
  CPC combination set(s) only.
  See application file for complete search history.

(56) References Cited

U.S. PATENT DOCUMENTS

| | | | |
|---|---|---|---|
| 5,280,503 A | 1/1994 | Betts et al. | |
| 5,857,190 A | 1/1999 | Brown | |
| 6,026,414 A | 2/2000 | Anglin | |
| 6,219,693 B1 | 4/2001 | Napolitano et al. | |
| 6,260,069 B1 | 7/2001 | Anglin | |
| 6,301,605 B1 | 10/2001 | Napolitano et al. | |
| 6,721,806 B2 | 4/2004 | Boyd et al. | |
| 7,418,487 B2 | 8/2008 | Andreas | |
| 7,475,207 B2 | 1/2009 | Bromling et al. | |
| 7,487,153 B2 | 2/2009 | Makhervaks et al. | |
| 7,554,976 B2 | 6/2009 | Feng et al. | |

(Continued)

FOREIGN PATENT DOCUMENTS

| CN | 100380334 | 4/2008 |
|---|---|---|
| EP | 1498822 A2 | 1/2005 |

(Continued)

OTHER PUBLICATIONS rfc5040, "A Remote Direct Memory Access Protocol Specification", Oct. 2007, Network Working Group, 66 pages.*

(Continued)

*Primary Examiner* — Brian J Gillis
*Assistant Examiner* — Amy Ling
(74) *Attorney, Agent, or Firm* — Honigman Miller Schwartz and Cohn LLP

(57) ABSTRACT

A distributed storage system that includes memory hosts. Each memory host includes non-transitory memory and a network interface controller in communication with the memory and servicing remote direct memory access requests from clients. The memory receives a data transfer rate from each client in communication with the memory host through remote direct memory access. Each memory host also includes a data processor in communication with the memory and the network interface controller. The data processor executes a host process that reads each received client data transfer rate, determines a throttle data transfer rate for each client, and writes each throttle data transfer rate to non-transitory memory accessible by the clients through remote direct memory access.

25 Claims, 14 Drawing Sheets

(56) References Cited

U.S. PATENT DOCUMENTS

| | | |
|---|---|---|
| 7,565,454 B2 | 7/2009 | Zuberi |
| 7,716,180 B2 | 5/2010 | Vermeulen et al. |
| 7,725,535 B2 | 5/2010 | Koonce et al. |
| 7,761,619 B2 | 7/2010 | Feng et al. |
| 7,827,350 B1 | 11/2010 | Jiang et al. |
| 7,934,055 B2 | 4/2011 | Flynn et al. |
| 8,006,065 B2 | 8/2011 | Bestler |
| 8,019,940 B2 | 9/2011 | Flynn et al. |
| 8,090,790 B2 | 1/2012 | Bestler |
| 8,095,730 B1 | 1/2012 | Jiang et al. |
| 8,122,155 B1 | 2/2012 | Marti |
| 8,224,777 B2 | 7/2012 | Kimmel |
| 8,325,633 B2 | 12/2012 | Archer et al. |
| 8,468,521 B2 | 6/2013 | Pawlowski |
| 9,058,122 B1* | 6/2015 | Nesbit .................. G06F 3/0659 |
| 2003/0149750 A1 | 8/2003 | Franzenburg |
| 2004/0049774 A1 | 3/2004 | Boyd et al. |
| 2004/0073622 A1 | 4/2004 | McDaniel et al. |
| 2004/0111498 A1 | 6/2004 | Andreas |
| 2004/0225719 A1* | 11/2004 | Kisley ..................... G06F 3/061 709/212 |
| 2005/0015469 A1 | 1/2005 | Zuberi |
| 2005/0129045 A1 | 6/2005 | Machulsky et al. |
| 2005/0198062 A1 | 9/2005 | Shapiro |
| 2005/0213608 A1 | 9/2005 | Modi et al. |
| 2006/0165084 A1 | 7/2006 | Makhervaks et al. |
| 2006/0168091 A1 | 7/2006 | Makhervaks et al. |
| 2006/0256784 A1 | 11/2006 | Feng et al. |
| 2006/0259570 A1 | 11/2006 | Feng et al. |
| 2008/0140932 A1 | 6/2008 | Flynn et al. |
| 2008/0235746 A1 | 9/2008 | Peters et al. |
| 2008/0256074 A1* | 10/2008 | Lev ........................ G06F 9/466 |
| 2008/0256183 A1 | 10/2008 | Flynn et al. |
| 2008/0256292 A1 | 10/2008 | Flynn et al. |
| 2008/0313364 A1 | 12/2008 | Flynn et al. |
| 2009/0100163 A1 | 4/2009 | Tsao et al. |
| 2010/0011119 A1* | 1/2010 | Knowlton ............... H04L 47/10 709/235 |
| 2010/0017802 A1 | 1/2010 | Lojewski |
| 2010/0083247 A1 | 4/2010 | Kanevsky et al. |
| 2011/0016239 A1 | 1/2011 | Stenfort |
| 2011/0066824 A1 | 3/2011 | Bestler |
| 2011/0093740 A1 | 4/2011 | Tsao et al. |
| 2011/0179225 A1 | 7/2011 | Flynn et al. |
| 2011/0296277 A1 | 12/2011 | Flynn et al. |
| 2012/0011176 A1 | 1/2012 | Aizman |
| 2012/0066407 A1 | 3/2012 | Andries et al. |
| 2012/0072607 A1 | 3/2012 | Kawashima et al. |
| 2012/0117610 A1 | 5/2012 | Pandya |
| 2012/0221803 A1* | 8/2012 | Stabrawa ............. G06F 3/0611 711/154 |
| 2013/0007380 A1 | 1/2013 | Seekins et al. |
| 2013/0067193 A1* | 3/2013 | Kagan ................. G06F 12/1081 711/206 |
| 2013/0086269 A1 | 4/2013 | Bairavasundaram et al. |
| 2013/0086324 A1 | 4/2013 | Soundararajan et al. |

FOREIGN PATENT DOCUMENTS

| | | |
|---|---|---|
| EP | 1543422 A1 | 6/2005 |
| EP | 1552409 A1 | 7/2005 |
| EP | 1839162 A1 | 10/2007 |
| JP | 04012545 | 1/1992 |
| JP | 2011222011 A | 11/2011 |
| KR | 2005009685 | 1/2005 |
| KR | 20050057185 | 6/2005 |
| KR | 2007072682 | 7/2007 |
| KR | 754308 B | 9/2007 |
| WO | WO-2004017220 A1 | 2/2004 |
| WO | WO-2004023305 A1 | 3/2004 |
| WO | WO-2006076993 A1 | 7/2006 |
| WO | WO-2006124718 A2 | 11/2006 |
| WO | WO-2008070172 A2 | 6/2008 |
| WO | WO-2012061255 A2 | 5/2012 |

OTHER PUBLICATIONS

International Search Report and Written Opinion for Application No. PCT/US2014/048163 dated Oct. 30, 2014.

* cited by examiner

ISOLATING CLIENTS OF DISTRIBUTED STORAGE SYSTEMS

TECHNICAL FIELD

This disclosure relates to distributed storage systems.

BACKGROUND

A distributed system generally includes many loosely coupled computers, each of which typically include a computing resource (e.g., processor(s)) and storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes.

A remote procedure call is a two-sided software operation initiated by client software executing on a first machine and serviced by server software executing on a second machine. Servicing storage system requests (e.g., read data) in software may require an available processor, which may place a significant limitation on a distributed storage system. In the case of a distributed storage system, this means a client process cannot access a remote computer's storage resources unless the remote computer has an available processor to service the client's request. Moreover, the demand for processor resources and storage resources in a distributed system often do not match. In particular, computing resources (i.e., processors) may have heavy and/or unpredictable usage patterns, while storage resources may have light and very predictable usage patterns.

Isolating performance of users connecting to the same server is typically done by limiting or rejecting user operations at the server. If there are insufficient resources to process a request the server can reject it. For example, server-side resource management involves tracking the amount of resources consumed by each user on a server. As requests enter the server, the server uses its global knowledge of incoming requests to decide whether or not to service a new request.

SUMMARY

When client requests to a server are single-sided operations (e.g., remote direct memory access (RDMA)), such as those in a single-sided distributed storage system, there is no server-side processing of the request. Eliminating the server-side processing not only prevents the server from rejecting requests when it becomes overloaded, it prevents the server process from even detecting it is overloaded. Consequently, resources shared among users/clients accessing the same server, such as bandwidth, cannot be managed in a traditional manner. For example, server-side resource management does not work for RDMA requests, because the server process does not service the request. The request is serviced directly by special-purpose hardware. Although each client can strictly limit the rate at which requests are made to the server in order to reduce resource usage at the server, the client lacks global knowledge of how much resources other clients may be using. Performance isolation among clients ensures misbehaving clients do not unnecessarily reduce the performance of well-behaved clients and allow different quality-of-service classes to be established among clients.

One aspect of the disclosure provides a distributed storage system that includes memory hosts. Each memory host includes non-transitory memory and a network interface controller in communication with the memory and servicing remote direct memory access requests from clients. The memory receives a data transfer rate from each client in communication with the memory host through remote direct memory access. Each memory host also includes a data processor in communication with the memory and the network interface controller. The data processor executes a host process that reads each received client data transfer rate, determines a throttle data transfer rate for each client, and writes each throttle data transfer rate to non-transitory memory accessible by the clients through remote direct memory access.

Implementations of the disclosure may include one or more of the following features. In some implementations, after establishing a communication connection with a client, the data processor instantiates a first memory region in the non-transitory memory for receiving the data transfer rate for that client and a second memory region in the non-transitory memory for writing the throttle rate for that client. The host process may periodically read the first memory region for each client before determining the throttle rate for each client. In some examples, the host process registers a set of remote direct memory accessible regions of the memory with the network interface controller. The host process establishes a remote direct memory access capable connection with the client in response to receiving a connection request from the client. The host process may unilaterally break the connection with a client when the client fails to adhere to its corresponding throttle data transfer rate over a period of time.

In some implementations, the memory receives the client data transfer rate of a client after every transfer of a threshold amount of data between the client and the memory host. The host process may determine the throttle data transfer rate of each client after receipt of a client data transfer rate from any one client.

The host process may receive an isolation configuration providing a bandwidth capacity for the memory host and a list of bandwidth reservations for clients. Each bandwidth reservation reserves a threshold data transfer rate for a client. The host process determines the throttle data transfer rates of clients based on the isolation configuration. The bandwidth capacity of a memory host may include reserved bandwidth for servicing memory access requests associated with bandwidth reservations and flex bandwidth for servicing memory access requests unassociated with any bandwidth reservations. When determining the throttle data transfer rate of a client, for any associated bandwidth reservations of the client, the host process may assign reserved bandwidth equal to an equally divided share of those bandwidth reservations across the memory hosts and assign an equally divided share of flex bandwidth with respect to all clients in communication with the memory host. Moreover, when determining the throttle data transfer rate of a client, the host process may redistribute unused bandwidth associated with one or more bandwidth reservations of a client to other clients.

In some implementations, the host process associates an isolation class with a client. The isolation class has one or more associated memory access requests. The host process determines an assigned bandwidth for each client based on the bandwidth capacity of the memory host, an allotted bandwidth for each isolation class of each client based on the assigned bandwidths for each client, a bandwidth for each memory access request associated with each isolation class based on the bandwidth of the corresponding isolation class, and the throttle transfer rate for each client based on at least one of: the assigned bandwidth of the client; the allotted bandwidth for each isolation class; or the bandwidth for each memory access request.

The distributed storage system may include a curator in communication with the memory hosts. The curator allocates memory in the memory hosts for data chunks of a file. In response to a memory access request from a client in communication with the memory hosts and the curator, the curator returns a file descriptor to the client that maps data chunks of a file on the memory hosts for remote direct memory access of the data chunks on the memory hosts. The file descriptor includes a client key for each data chunk of the file. Each client key allows access to the corresponding data chunk on its memory host. The curator denies access to file descriptors to clients failing to adhere to their corresponding throttle data transfer rates over a period of time.

Another aspect of the disclosure provides a method of isolation in a distributed storage system. The method includes receiving into non-transitory memory a data transfer rate from each client in communication with the memory through remote direct memory access and reading, into a data processor in communication with non-transitory memory, each received client data transfer rate. The method also includes determining a throttle data transfer rate for each client and writing from the data processor each throttle data transfer rate to non-transitory memory accessible by the clients through remote direct memory access.

In some implementations, the method includes, after establishing a communication connection with a client, instantiating a first memory region in the non-transitory memory for receiving the data transfer rate for that client and a second memory region in the non-transitory memory for writing the throttle rate for that client. The method may also include periodically reading the first memory region for each client before determining the throttle rate for each client. The method may include registering a set of remote direct memory accessible regions of the memory with a network interface controller and establishing a remote direct memory access capable connection with the client in response to receiving a connection request from the client. If a client fails to adhere to its corresponding throttle data transfer rate over a period of time, the method may include unilaterally breaking the connection with the client.

The method may include receiving the client data transfer rate of a client in the memory after every transfer of a threshold amount of data between the client and the memory. Moreover, the method may include determining the throttle data transfer rate of each client after receipt of a client data transfer rate from any one client.

In some implementations, the method includes receiving an isolation configuration providing a bandwidth capacity for the memory host and a list of bandwidth reservations for clients and determining the throttle data transfer rates of clients based on the isolation configuration. Each bandwidth reservation reserves a threshold data transfer rate for a client. The bandwidth capacity of a memory host may include reserved bandwidth for servicing memory access requests associated with bandwidth reservations and flex bandwidth for servicing memory access requests unassociated with any bandwidth reservations.

The step of determining the throttle data transfer rate of a client may include, for any associated bandwidth reservations of the client, assigning reserved bandwidth equal to an equally divided share of those bandwidth reservations across memory hosts of the distributed storage system and assigning an equally divided share of flex bandwidth with respect to all clients in communication with the memory host. The step may also include redistributing unused bandwidth associated with one or more bandwidth reservations of a client to other clients.

In some implementations, the method includes associating an isolation class that has one or more associated memory access requests with a client and determining an assigned bandwidth for each client based on the bandwidth capacity of the memory host, an allotted bandwidth for each isolation class of each client based on the assigned bandwidths for each client, a bandwidth for each memory access request associated with each isolation class based on the bandwidth of the corresponding isolation class, and the throttle transfer rate for each client based on at least one of the assigned bandwidth of the client, the allotted bandwidth for each isolation class, or the bandwidth for each memory access request. The method may include receiving a key with a client memory access request to receive access to data in the memory.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
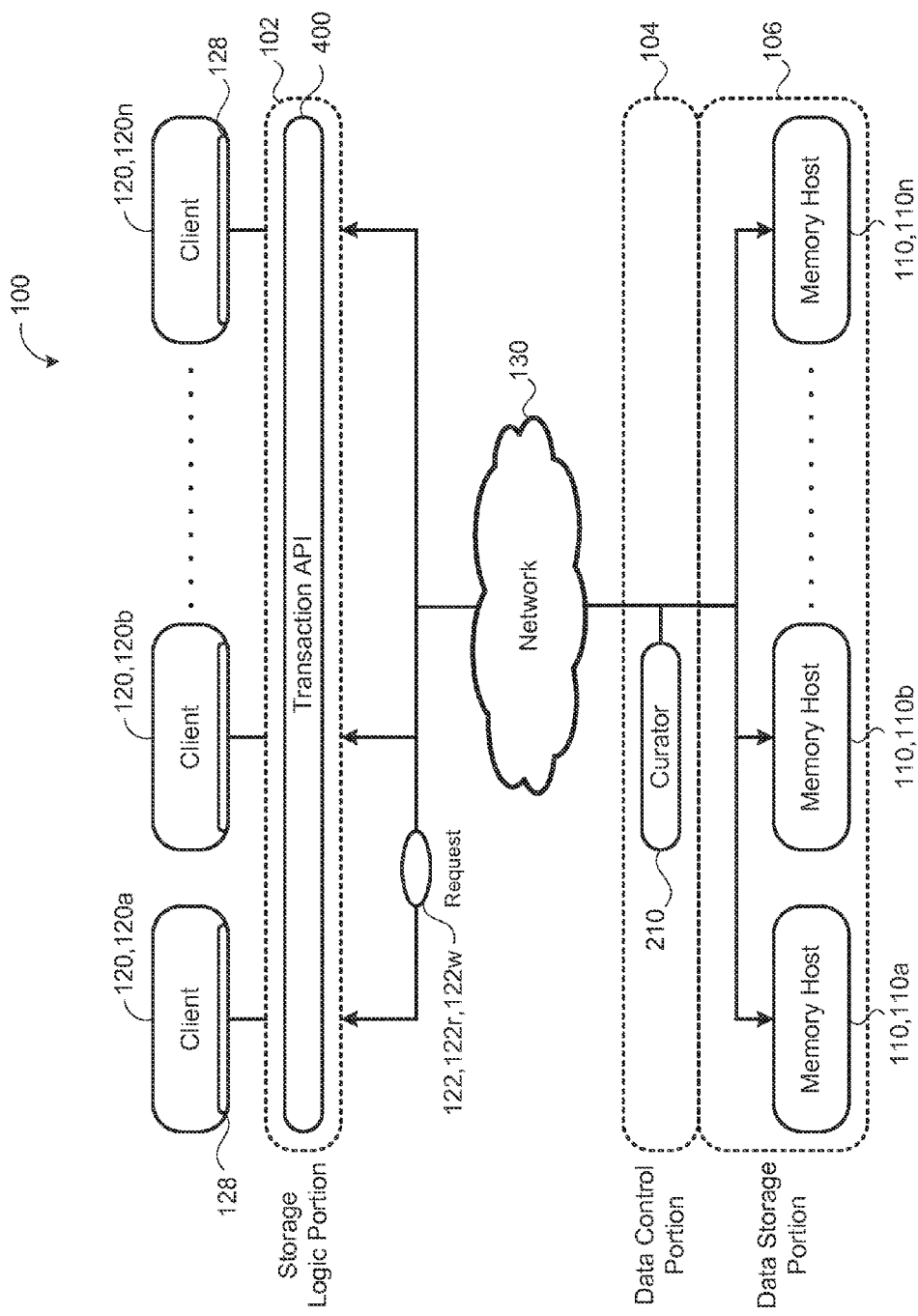
FIG. 1A is a schematic view of an exemplary distributed storage system.
Figure 1B:
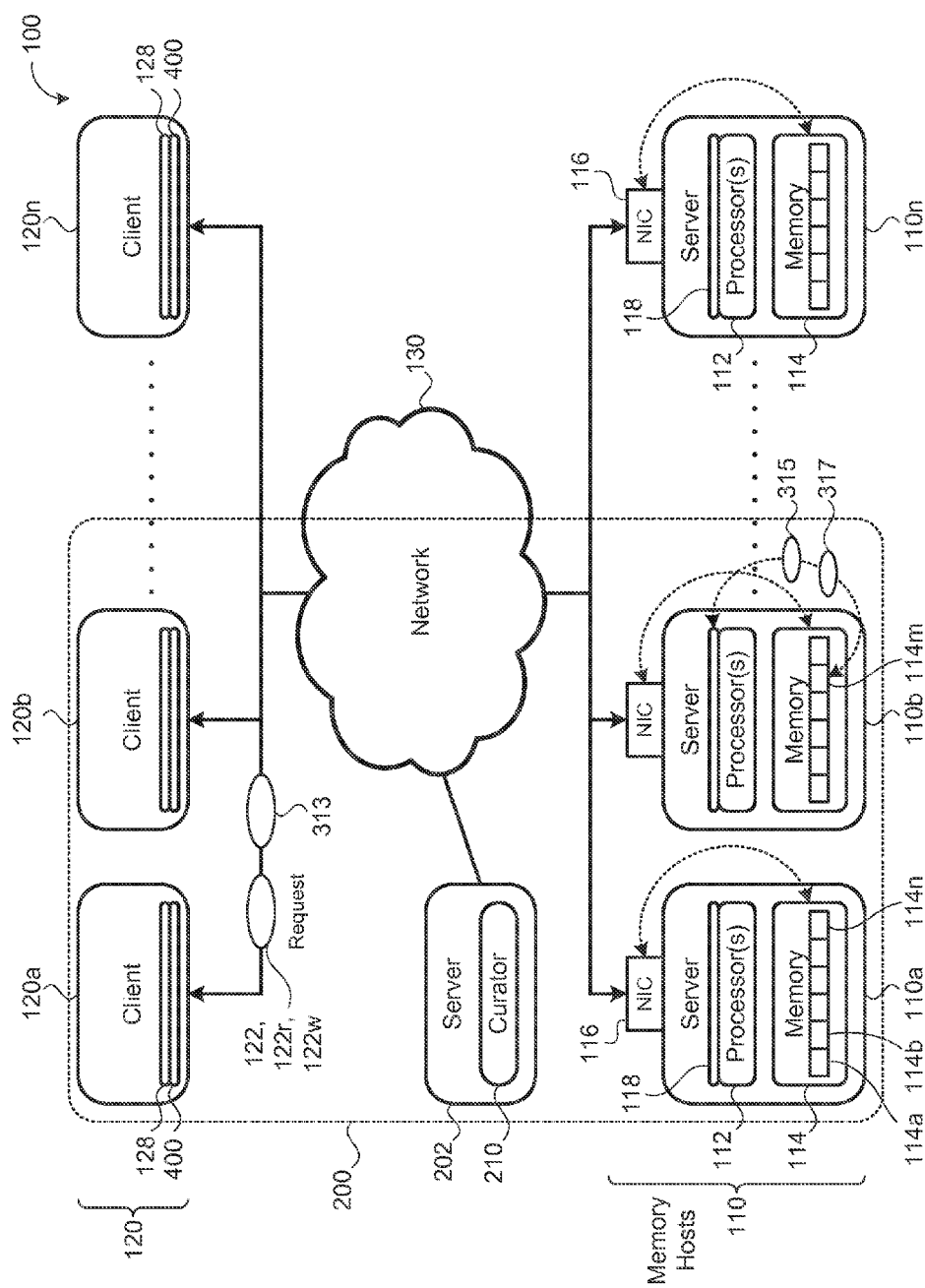
FIG. 1B is a schematic view of an exemplary distributed storage system having a cell of memory hosts managed by a curator.
Figure 1C:
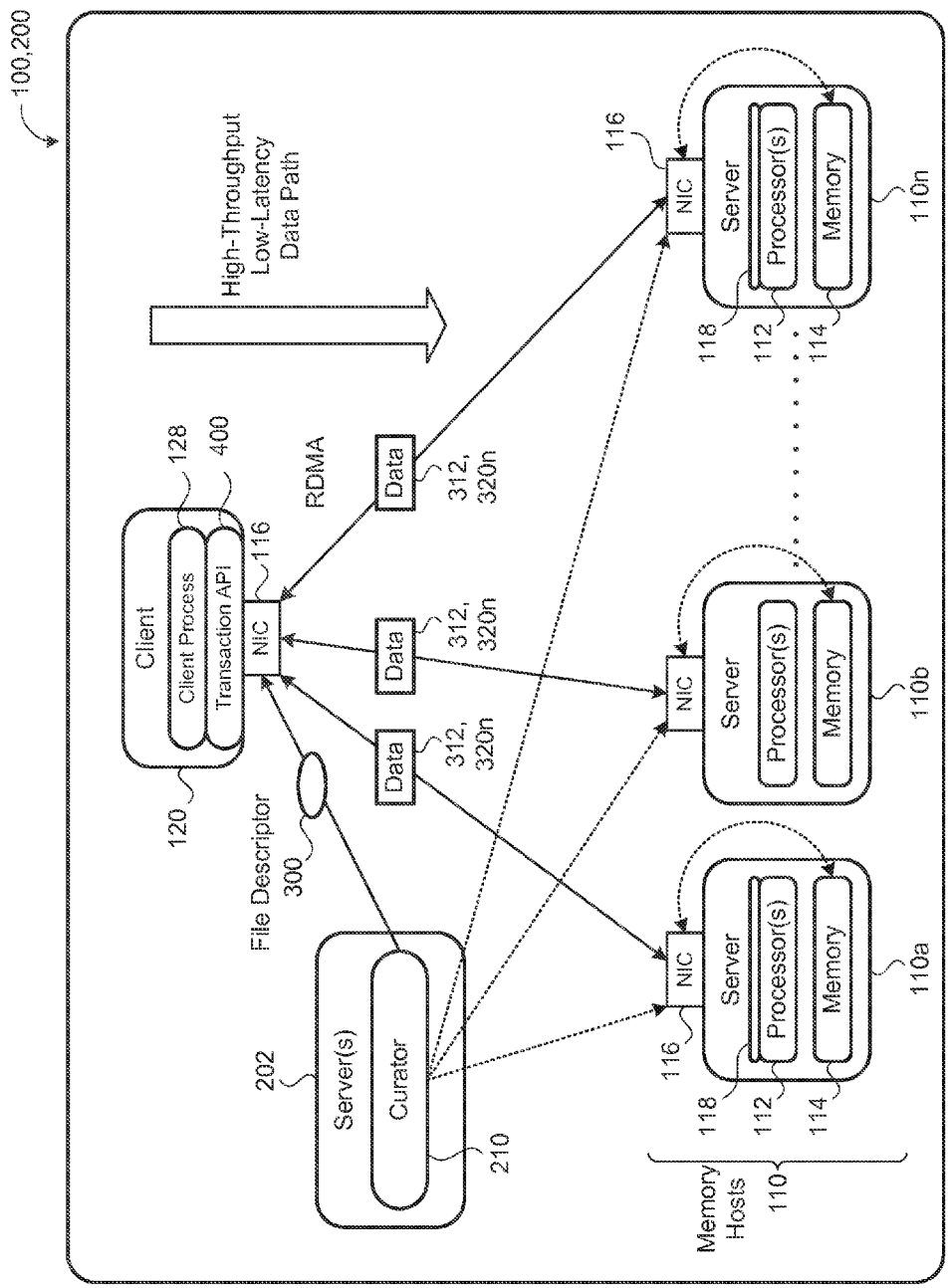
FIG. 1C is a schematic view of an exemplary cell of a distributed storage system.

Referring to FIGS. 1A-1C, in some implementations, a distributed storage system 100 includes loosely coupled memory hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data. A storage abstraction (e.g., key/value store or file system) overlain on the storage resources 114 allows scalable use of the storage resources 114 by one or more clients 120, 120a-n. The clients 120 may communicate with the memory hosts 110 through a network 130 (e.g., via RPC).

The single-sided distributed storage system 100 may eliminate the need for any server jobs for responding to remote procedure calls (RPC) from clients 120 to store or retrieve data 312 on their corresponding memory hosts 110 and may rely on specialized hardware to process remote requests 122 instead. "Single-sided" refers to the method by which most of the request processing on the memory hosts 110 may be done in hardware rather than by software executed on CPUs 112 of the memory hosts 110. Rather than having a processor 112 of a memory host 110 (e.g., a server) execute a server process that exports access of the corresponding storage resource 114 (e.g., non-transitory memory) to client processes executing on the clients 120, the clients 120 may directly access the storage resource 114 through a network interface controller (NIC) 116 of the memory host 110. In other words, a client process executing on a client 120 may directly interface with one or more storage resources 114 without requiring execution of a routine of any server processes executing on the computing resources 112. This offers a single-sided distributed storage architecture that offers relatively high-throughput and low latency, since clients 120 can access the storage resources 114 without interfacing with the computing resources 112 of the memory hosts 110. This has the effect of decoupling the requirements for storage 114 and CPU cycles that typical two-sided distributed storage systems carry. The single-sided distributed storage system 100 can utilize remote storage resources 114 regardless of whether there are spare CPU cycles on that memory host 110; furthermore, since single-sided operations do not contend for server CPU resources 112, a single-sided system can serve cache requests 122 with very predictable, low latency, even when memory hosts 110 are running at high CPU utilization. Thus, the single-sided distributed storage system 100 allows higher utilization of both cluster storage 114 and CPU resources 112 than traditional two-sided systems, while delivering predictable, low latency.

In some implementations, the distributed storage system 100 includes a storage logic portion 102, a data control portion 104, and a data storage portion 106. The storage logic portion 102 may include a transaction application programming interface (API) 400 (e.g., a single-sided transactional system client library) that is responsible for accessing the underlying data via single-sided operations. The data control portion 104 may manage allocation and access to storage resources 114 with tasks such as allocating storage resources 114, registering storage resources 114 with the corresponding network interface controller 116, setting up connections between the client(s) 120 and the memory hosts 110, handling errors in case of machine failures, etc. The data storage portion 106 may include the loosely coupled memory hosts 110, 110a-n.

In some implementations, the distributed storage system 100 stores data 312 in dynamic random access memory (DRAM) 114 and serves the data 312 from the remote hosts 110 via remote direct memory access (RDMA)-capable network interface controllers 116. A network interface controller 116 (also known as a network interface card, network adapter, or LAN adapter) may be a computer hardware component that connects a computing resource 112 to the network 130.

The network interface controller 116 implements communication circuitry using a specific physical layer (OSI layer 1) and data link layer (layer 2) standard, such as Ethernet, Wi-Fi, or Token Ring. This provides a base for a full network protocol stack, allowing communication among small groups of computers on the same LAN and large-scale network communications through routable protocols, such as Internet Protocol (IP). Both the memory hosts 110a-n and the client 120 may each have a network interface controller 116 for network communications. A host process 118 executing on the computing processor 112 of the memory host 110 registers a set of remote direct memory accessible regions 114a-n of the memory 114 with the network interface controller 116. The host process 118 may register the remote direct memory accessible regions 114a-n of the memory 114 with a permission of read-only or read/write. The network interface controller 116 of the memory host 110 creates a client key 321 for each registered memory region 114a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 400 translates commands, such a look up or insert data commands, into sequences of primitive network interface controller operations. The transaction API 400 interfaces with the data control and data storage portions 104, 106 of the distributed storage system 100.

The distributed storage system 100 may include a co-located software process to register memory 114 for remote access with the network interface controllers 116 and set up connections 250 (FIGS. 3A and 3B) with client processes 128. Once the connections 250 are set up, client processes 128 can access the registered memory 114 via engines in hardware of the network interface controllers 116 without any involvement from software on the local CPUs 112 of the corresponding memory hosts 110.

Referring to FIGS. 1B and 1C, in some implementations, the distributed storage system 100 includes multiple cells 200, each cell 200 including memory hosts 110 and a curator 210 in communication with the memory hosts 110. The curator 210 (e.g., process) may execute on a computing processor 202 (e.g., server) connected to the network 130 and manages the data storage (e.g., manages a file system stored on the memory hosts 110), controls data placements, and/or initiates data recovery. Moreover, the curator 210 may track an existence and storage location of data on the memory hosts 110. Redundant curators 210 are possible. In some implementations, the curator(s) 210 track the striping of data 312 across multiple memory hosts 110 and the existence and/or location of multiple copies of a given stripe for redundancy and/or performance. In computer data storage, data striping is the technique of segmenting logically sequential data 312, such as a file 310 (FIG. 2B), in a way that accesses of sequential segments are made to different physical storage devices (e.g., cells 200 and/or memory hosts 110). Striping is useful when a processing device requests access to data 312 more quickly than a storage device can provide access. By performing segment accesses on multiple devices, multiple segments can be accessed concurrently. This provides more data access throughput, which avoids causing the processor to idly wait for data accesses.

In some implementations, the transaction API 400 interfaces between a client 120 (e.g., with the client process 128) and the curator 210. In some examples, the client 120 communicates with the curator 210 through one or more remote procedure calls (RPC). In response to a client request 122, the transaction API 400 may find the storage location of certain data 312 on memory host(s) 110, and obtain a key 321 that allows access to the data 312. The transaction API 400 communicates directly with the appropriate memory hosts 110 (via the network interface controllers 116) to read or write the data 312 (e.g., using remote direct memory access). In the case that a memory host 110 is non-operational, or the data 312 was moved to a different memory host 110, the client request 122 fails, prompting the client 120 to re-query the curator 210.

Figure 2A:
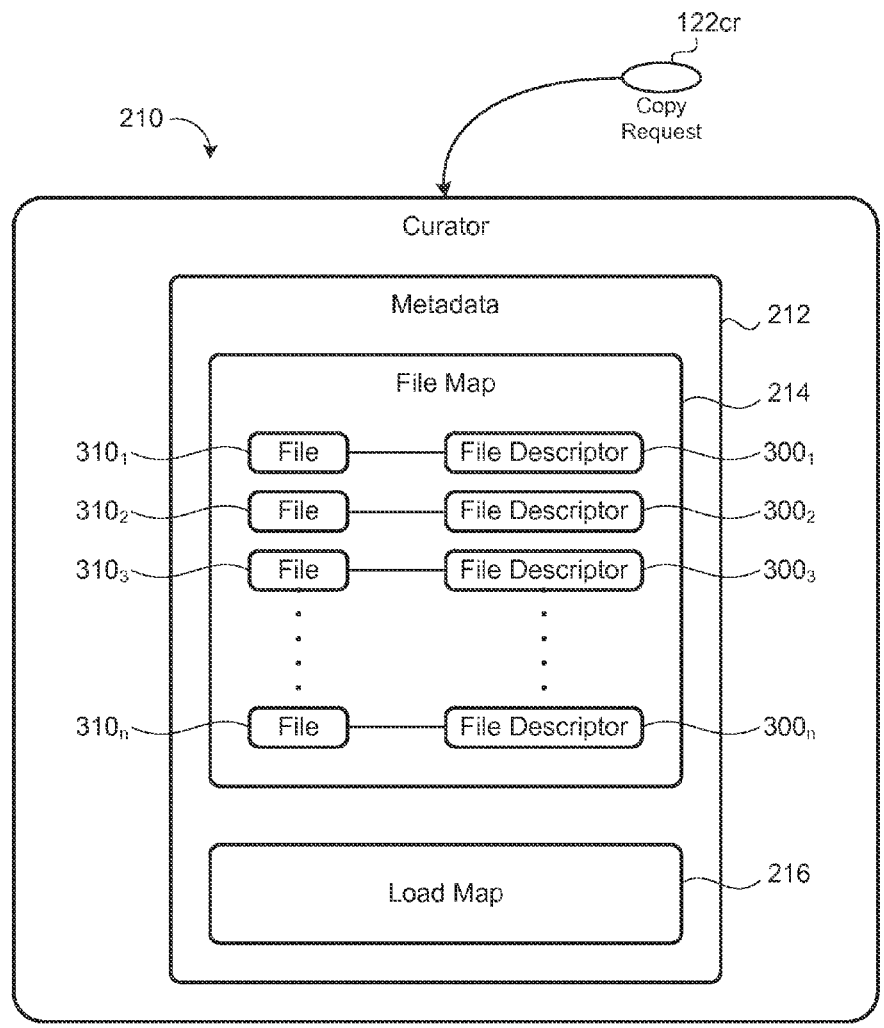
FIG. 2A is a schematic view of an exemplary curator for a distributed storage system.

Referring to FIG. 2A, in some implementations, the curator 210 stores and manages file system metadata 212. The metadata 212 includes a file map 214 that maps files $310_{1-n}$, to file descriptors $300_{1-n}$. The curator 210 may examine and modify the representation of its persistent metadata 212. The curator 210 may use three different access patterns for the metadata 212: read-only, file transactions, and stripe transactions. Read-only access allows the curator 210 to examine a state of the metadata 212 with minimal contention. A read-only request returns the most recent state of a file 310, but with no synchronization with concurrent updates. The read-only access may be used to respond to lookup requests from clients 120 (e.g., for internal operations, such as file scanning).

Figure 2B:
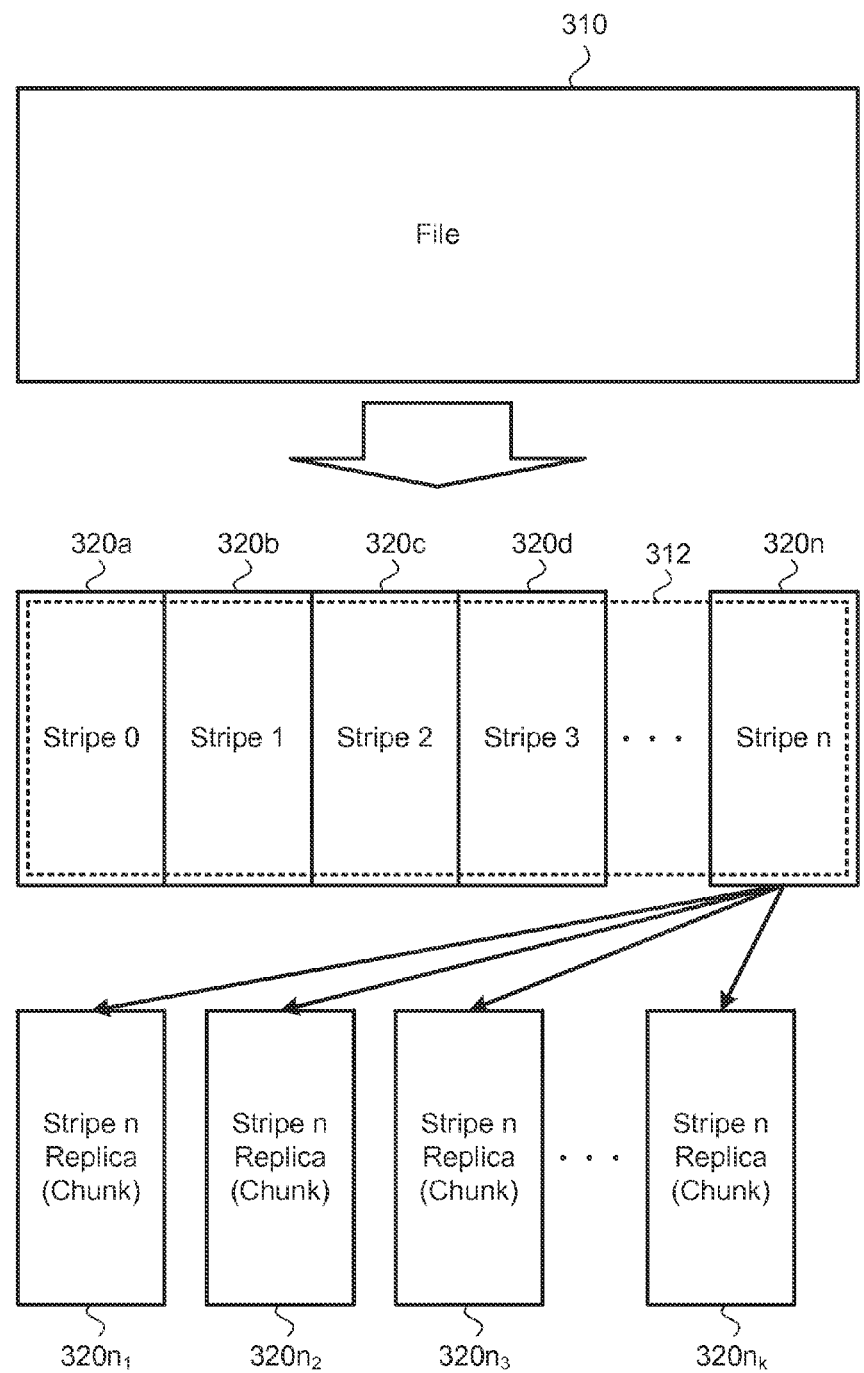
FIG. 2B is a schematic view of an exemplary file split into replicated stripes.
Figure 2C:
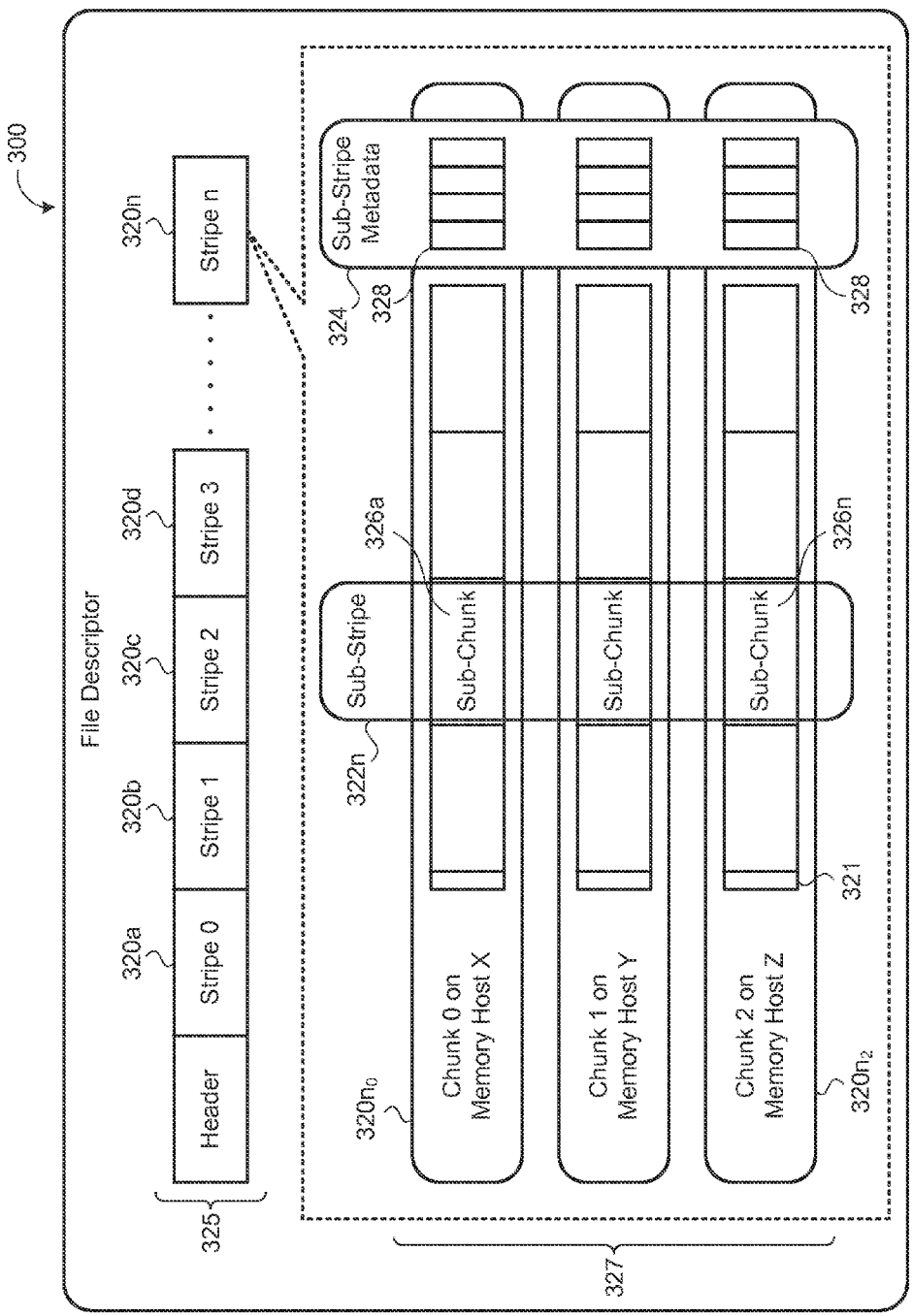
FIG. 2C is a schematic view of an exemplary file descriptor.

Referring also to FIGS. 2B and 2C, in some implementations, the memory hosts 110 store file data 312. The curator 210 may divide each file 310 (and its data 312) into stripes 320a-n and replicate the stripes 320a-n for storage in multiple storage locations. A stripe replica $320n_k$ is also referred to as a chunk or data chunk $320n_k$. Mutable files 310 may have additional metadata 212 stored on the memory host(s) 110, such as lock words and version numbers. The lock words and version numbers may be used to implement a distributed transaction commit protocol.

File descriptors $300_{1-n}$ stored by the curator 210 contain metadata 212, such as the file map 214, that maps the stripes 320a-n to data chunks $320n_k$ (i.e., stripe replicas) stored on the memory hosts 110. To open a file 310, a client 120 sends a request 122 to the curator 210, which returns a file descriptor 300. The client 120 uses the file descriptor 300 to translate file chunk offsets to remote memory locations 114a-n. After the client 120 loads the file descriptor 300, the client 120 may access the data 312 of a file 310 via RDMA or another data retrieval method.

Figure 3A:
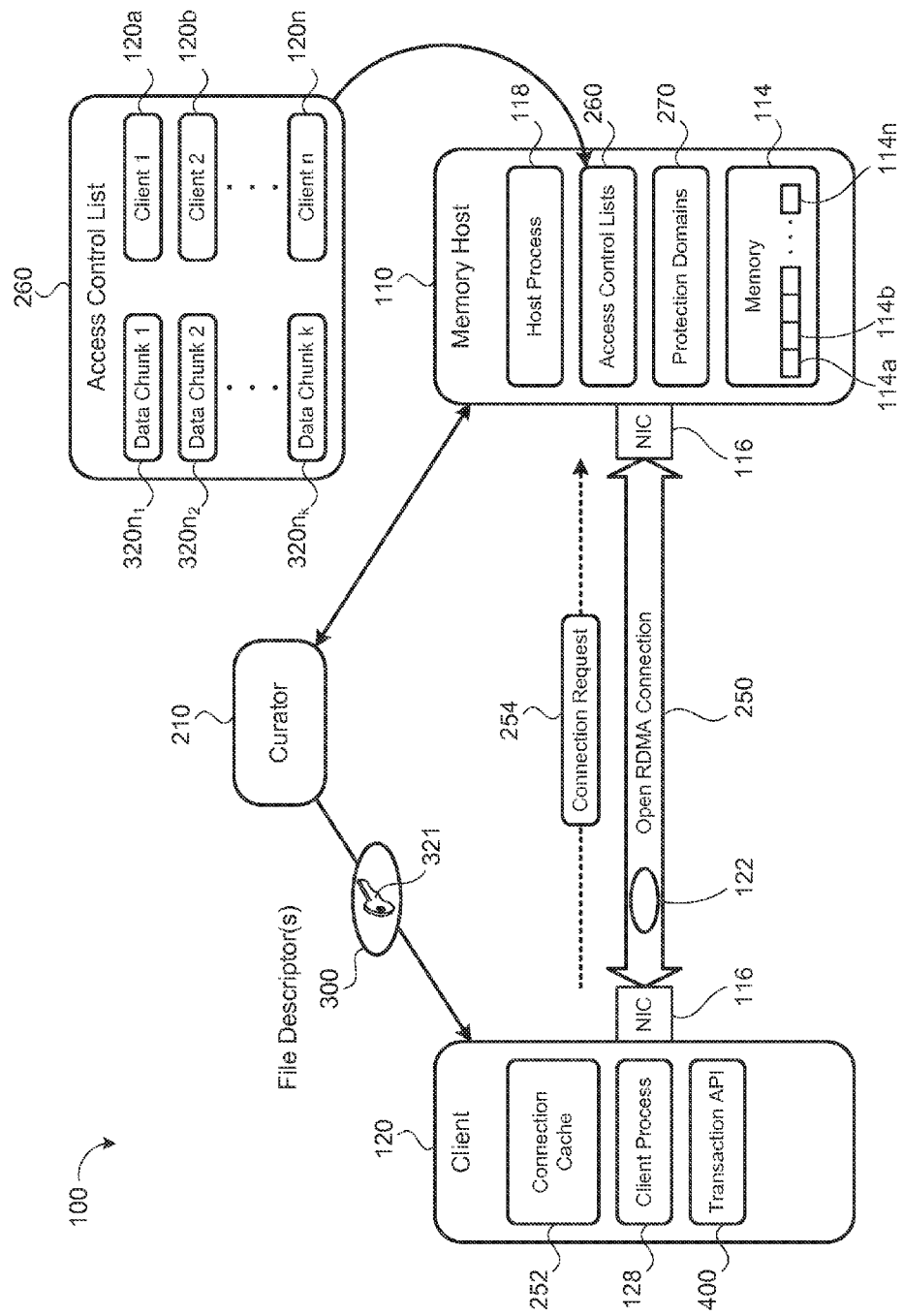
FIG. 3A is a schematic view of establishing a connection between a client and memory host of an exemplary distributed storage system.
Figure 3B:
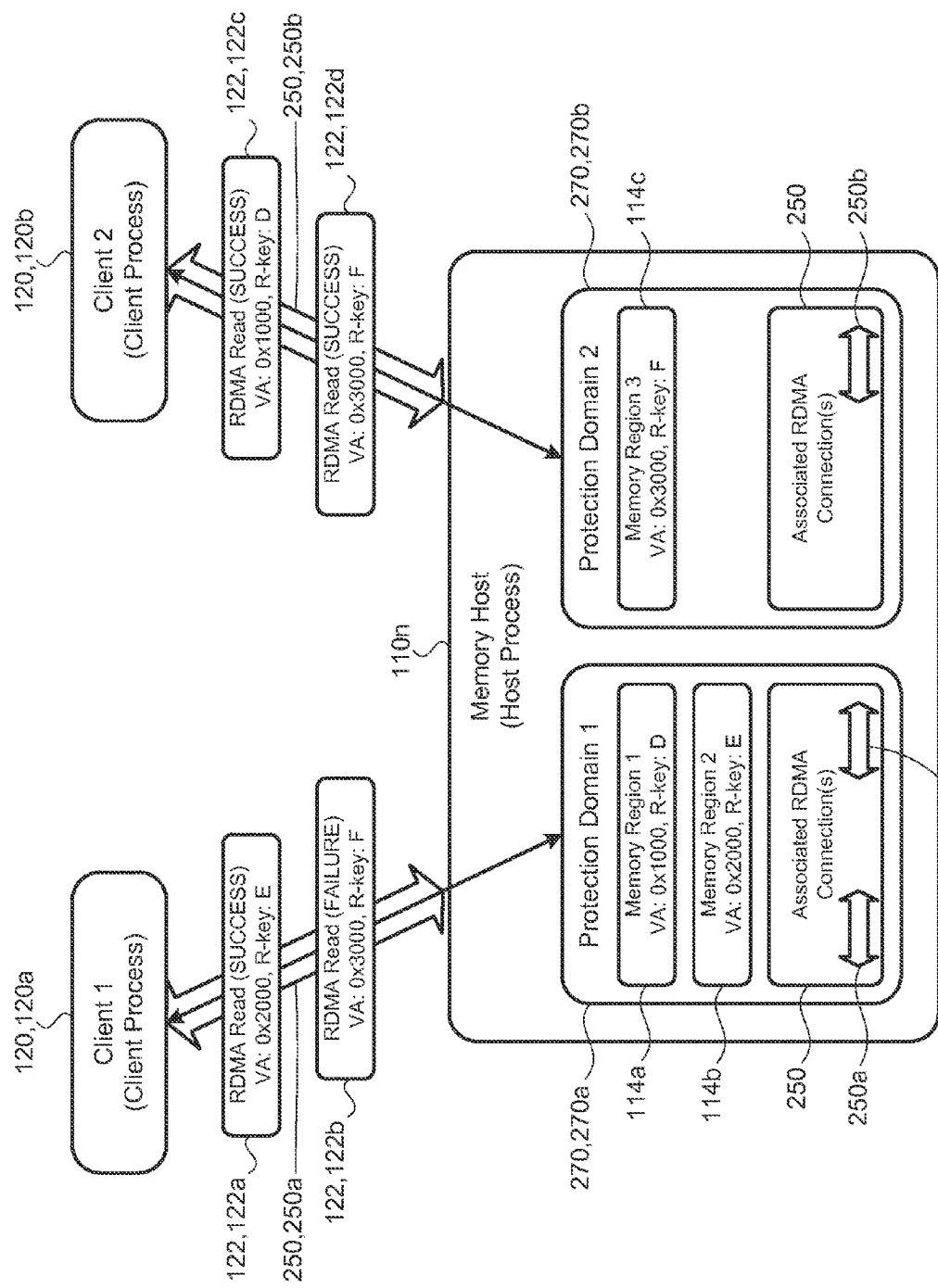
FIG. 3B is a schematic view of clients sending memory access requests to a memory host of an exemplary distributed storage system.

Referring to FIGS. 3A and 3B, RDMA is a connection-based process-to-process communication mechanism, so RDMA connections typically do not support authentication or encryption by themselves. As a result, the distributed storage system 100 may treat the RDMA connections 250 as secure resources. In order for a client process 128 to access the memory 114 of a host process 118 through RDMA, the network interface controller 116 of the memory host 110 executes a connection handshake with a network interface controller 116 of the client process 128 to establish the RDMA capable connection 250 between the host process 118 and the client process 128. The RDMA connection handshake may implement a higher-level secure protocol that evaluates the identities of the host and client processes 118, 128 as known at the time of creation of the trusted RDMA connection 250. After an RDMA-capable connection 250 is established, the client process 128 or the host process 118 can unilaterally break the connection 250. If either the client process 128 or the host process 118 dies, the client 120 and/or the memory host 110 (via operating systems) can tear down the corresponding RDMA connection(s) 250.

Access to file data 312 (e.g., data chunks $320n_k$) stored in remote memory locations 114a-n may be controlled by access control lists 260. Each access control list 260 may have a unique name, a list of data chunks $320n_k$, and a list of clients 120a-n that have permission to read and write the data chunks $320n_k$ associated with that access control list 260. In some examples, the access control list 260 provides an access permission level for each associated client 120 or each associated data chunk $320n_k$. The memory hosts 110 may receive the access control lists 260 through a secure communication channel and can be enforced by the memory hosts 110 using protection domains 270. Each RDMA accessible memory region 114a-n registered with the network interface controller 116 of each memory host 110 is associated with a protection domain 270. In some implementations, when the curator 210 allocates memory 114 for the data chunks $320n_k$, it associates the allocated memory regions 114a-n of the data chunks $320n_k$ with one or more protection domains 270. A memory host 110 may have many protection domains 270 associated with various regions 114a-n of its memory 114. Each protection domain 270 may also have one or more associated connections 250.

When a client 120 instantiates a memory access request 122 for a file 310 stored on one or more of the memory hosts 110, the client 120 requests a file descriptor 300 from the curator 210 to identify which memory host(s) 110 store the data chunks $320n_k$ of the file 310. In addition to mapping data chunks $320n_k$ of the file 310 to memory regions 114a-n of memory hosts 110, the file descriptor 300 may also include a client key 321 for accessing those data chunks $320n_k$. The client 120 then searches a connection cache 252 for any open RMDA capable connections 250 to the identified memory hosts 110. If each memory host 110 fails to have an open connection 250 with the client 120 that is in the same protection domain 270 as the requested data chunk(s) $320n_k$, the client 120 sends a connection request 254 to any memory hosts 110 not having the necessary open connection(s) 250.

In response to receiving a connection request 254 from a client process 128 of a client 120 to access a data chunk $320n_k$ (e.g., to access a memory region 114a-n storing the data chunk $320n_k$), the host process 128 may establish a remote direct memory access capable connection 250 with the client process 128 when both the client 120 and the requested data chunk $320n_k$ are associated with the same access control list 260 received by the memory host 110. The client process 128 may include the access control list 260 in the connection request 254. The host process 118 may associate the established open connection 250 with a protection domain 270 and the client process 128 may store the open connection 250 in the connection cache 252. The connection 250 is capable of accessing (via RDMA) only the memory regions 114a-n associated with its protection domain 270. The network interface controller 116 of the memory host 110 may tear down the connection 250 upon receiving an RDMA request having an address for unregistered memory 114.

In the example shown in FIG. 3B, first and second clients 120a, 120b send memory access requests 122 to a memory host 110n over respective first and second RDMA connections 250a, 250b. The memory host 110n has first and second protection domains 270a, 270b associated with its memory 114. The first protection domain 270a is associated with first and second memory regions 114a, 114b (e.g., storing corresponding first and second data chunks $320n_1$, $320n_2$) and the first RDMA connection 250a, while the second protection domain 270b is associated with a third memory region 114c (e.g. storing a corresponding third data chunks $320n_3$) and only the second RDMA connection 250a.

The first client 120a sends first and second memory access requests 122a, 122b over the first RMDA connection 250a to the memory host 110n. The first memory access request 122a is for accessing the second memory region 114b for the second data chunk $320n_2$ and the second memory access request 122b is for accessing the third memory region 114c for the third data chunk $320n_3$. The first memory access request 122a succeeds, because the second memory region 114b belongs to the same protection domain 270a as the first connection 250a. The second memory access request 122b fails, because the third memory region 114c belongs to a different protection domain 270, the second protection domain 270b, rather than the protection domain 270 of the second memory access request 122b (i.e., the first protection domain 270a).

The second client 120b sends third and fourth memory access requests 122c, 122d over the second RDMA connection to the memory host 110n. The third memory access request 122c is for accessing the first memory region 114a for the first data chunk $320n_1$ and the fourth memory access request 122d is for accessing the third memory region 114c for the third data chunk $320n_3$. In this case, both memory access requests 122c, 122d succeed, because the RDMA connection 250b of the second client 120b belongs to the protection domains 270a, 270b of both the first memory region 114a and the third memory region 114c.

When client requests 122 to a memory host 110 (e.g., server) are single-sided operations (e.g., remote direct memory access (RDMA)), there is no server-side processing of the request. Eliminating the server-side processing not only prevents the memory host 110 from rejecting requests 122 when it becomes overloaded; it prevents the server process from even detecting that the memory host 110 is overloaded. Consequently, bandwidth for computing resources 112 and/or storage resources 114 shared among clients 120 cannot be managed in a traditional manner. For example, server-side resource management does not work for RDMA requests 122, because the host process 118 does not service the request 122. The request 122 is serviced directly by special-purpose hardware, the network interface controller 116. Although each client 120 can strictly limit the rate at which requests 122 are made to the memory host 110 in order to reduce resource usage at the memory host 110, the client 120 lacks global knowledge of how much resources 112, 114 other clients 120 may be using. Performance isolation among clients 120 ensures misbehaving clients 120 do not unnecessarily reduce the performance of well-behaved clients 120 and allow different quality-of-service classes to be established among clients 120.

Figure 1D:
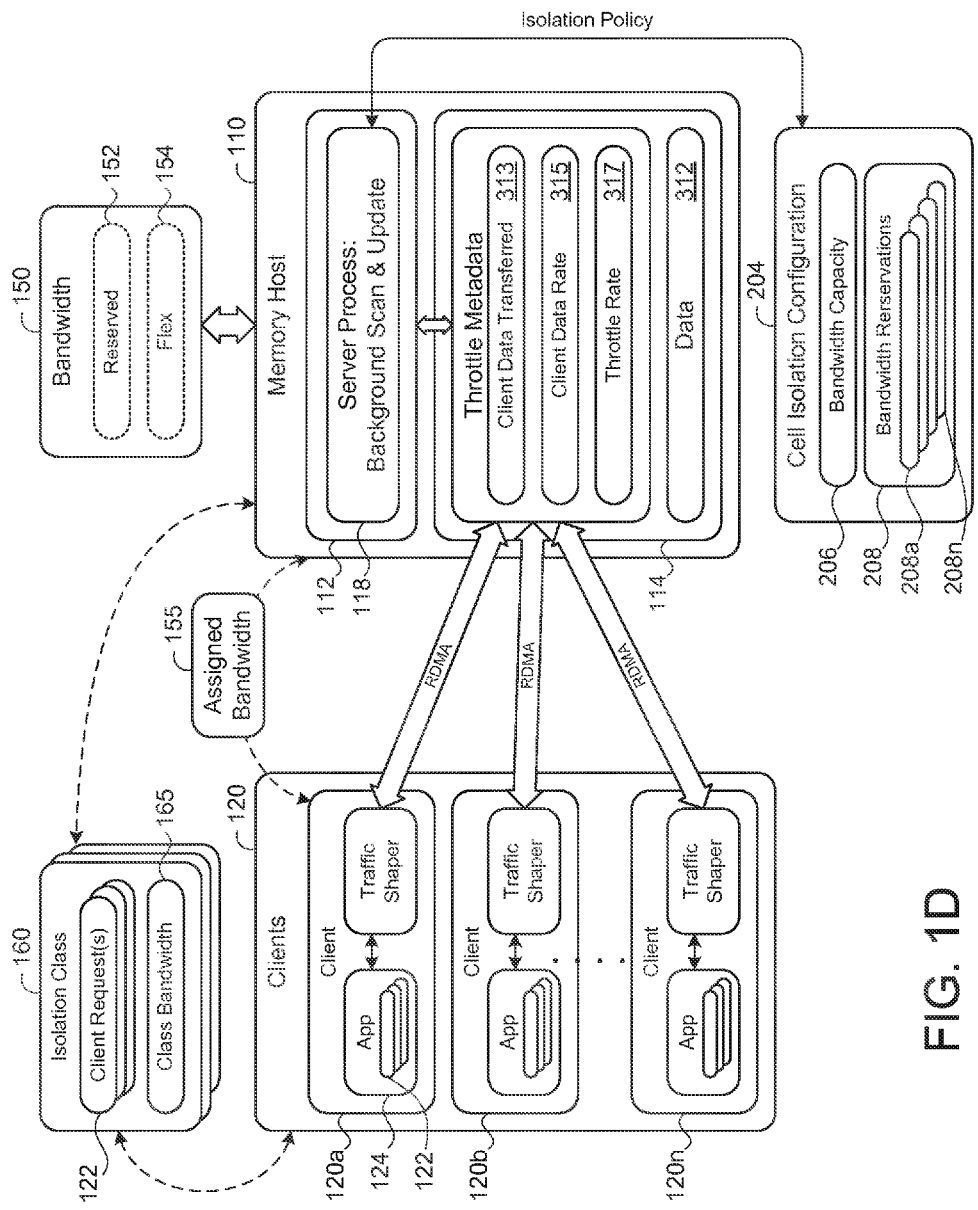
FIG. 1D is a schematic view of an exemplary memory host interacting with clients.

Referring again to FIGS. 1B and 1D, in some implementations, each client 120 tracks the amount of data 312 transferred between it and each memory host 110 and writes a transferred data amount 313 (also referred to as bytes transferred) to an RDMA accessible memory region 114n on the memory host 110. In other words, each client 120 keeps a running sum of the total number of bytes read/written to the memory host 110, and periodically writes this sum to the memory host 110. Each client 120 has its own memory region 114n on each memory host 110. The memory host 110 creates and initializes the memory region 114n at connection setup time, and sends a location of the memory region 114n to the client 120 upon the initial establishment of the connection 250. The client 120 writes the memory region 114n after a threshold change in the amount of data 312 transferred, e.g., 128 kilobytes. This policy causes clients 120 that are using more bandwidth and are more likely to require throttling to update their bytes transferred 313 more frequently and low bandwidth clients 120 to communicate less frequently with the memory hosts 110. The threshold for pushing an update of bytes transferred 312 could vary widely based on the actual implementation, network, etc. Requiring clients 120 to push their bytes transferred 313 to the memory host 110 simplifies server isolation logic, and in turn, greatly reduces CPU usage.

Periodically, the memory host 110 scans the memory regions 114n containing clients' bytes transferred 313 (e.g., every 100 milliseconds), computes bandwidth usage, and computes client bandwidth shares 317, also referred to as throttle rates, for the memory host 110. In some implementations, the memory host 110 periodically reads the bytes transferred amount 313 (e.g., a sum), compares it to the last sum it read and computes a data rate 315 for the client 120 from the difference. The scan rate may be implementation dependent. Shorter times between scans result in finer grain control of the clients 120, but the tradeoff is higher server CPU utilization. The memory host 110 writes each client's computed throttle rate 317 to another local memory region 114m. The client 120 reads this throttle rate 317 from the memory host 110, e.g., via RDMA, when the client 120 writes the bytes transferred 313 to the memory host 110. The client 120 limits its data rate 315 to the throttle rate 317 most recently read from the memory host 110, e.g., via RDMA.

The client 120 is responsible for reading its current throttle rate 317 from the memory host 110 and self-enforcing that throttle rate 317. The client 120 is also responsible for tracking and periodically writing its own bytes transferred 313 to the memory host 110. This gives the memory host 110 the required global knowledge of data rates 315 for each connected client 120 without the host process 118 tracking each RDMA request 122 the hardware processes. With this information, the memory host 110 can partition bandwidth 150 for each client 120 and compute the appropriate throttle rates 317. The bandwidth 150 of a memory host 110 may include a reserved portion 152 (reserved bandwidth) and a flex portion 154 (flex bandwidth). In some implementations, flex bandwidth 154 is any unused reserved bandwidth 152.

By default every client 120 may receive an even share of bandwidth 150 from a memory host 110. The memory host 110 may be work-conserving by distributing any unused bandwidth 150 among clients 120 that can use it. In some implementations, bandwidth 150 is not distributed equally. First, the memory host 110 assigns reserved bandwidth 152 to each client 120 and any unused reserved bandwidth 152 is placed in a flex pool as flex bandwidth 154. The memory host 110 may divide the flex pool or flex bandwidth 154 equally among clients 120, with the exception that a client 120 that doesn't need the flex bandwidth 154 won't take it from the pool, but instead leaves it to be equally divided among clients 120 that can make use of the extra bandwidth 150. If the amount of bandwidth 150 available to a client 120 is insufficient or the client 120 requires bandwidth guarantees (e.g., since even share bandwidth 150 can vary over time), the client 120 may request assignment of reserved bandwidth 152 to an isolation class 160.

Isolation classes 160 allow requests 122 running as the same client 120 to receive differentiated service. A client 120 can have multiple associated isolation classes 160. A memory host 110 may define an isolation class 160 using an identifier, such as a client name plus an arbitrary string. A client 120 may execute an application 124 having one or more client requests 122. Each client 120 may have one or more associated isolation classes 160 and each isolation class 160 can contain one or more client requests 122. A client flag may determine which isolation class 160 a request 122 should use. Alternatively, the isolation class 160 may be specified by the client 120 on a per request basis so a single client 120 can use multiple isolation classes 160. Requests 122 running as different clients 120 may not share the same isolation class 160, because an isolation class 160 is a child of the client 120. An alternative implementation could have isolation classes 160 spanning multiple clients 120. An isolation class 160 may be allocated flex bandwidth 154 plus reserved bandwidth 152.

In some implementations, client 120, isolation class 160, and client requests 122 form a hierarchical relationship. Each client 120 may have one or more associated isolation classes 160 and each isolation class 160 may have one or more associated client requests 122. The memory host 110 may first divide its bandwidth 150 among clients 120. Then, for each client 120, the memory host 110 divides the assigned bandwidth 155 for the respective client 120 among its associated isolation classes 160. Then, for each isolation class 160, the memory host 110 divides the corresponding assigned bandwidth 155 among associated client requests 122.

Each cell 200 has a rated capacity in terms of bytes per second. In principle, the rated capacity of a cell 200 is the amount of data 312 that clients 120 can read from and write to the cell 200 per second. In practice, the rated capacity of a cell 200 may be divided evenly over the memory hosts 110 in the cell 200 and enforced on a per memory host basis. For example, a cell 200 with 1000 memory hosts 110 and a rated capacity of 1 TB/s may need to offer at least 1 GB/s of load on each memory host 110 in the cell 200 in order to serve 1 TB/s of data 312. The rated bandwidth capacity 206 of a memory host 110 can be less than the network interface controller bandwidth of the memory host 110, but not greater than the network interface controller bandwidth.

Memory hosts 110 access and compute shares of bandwidth 150 according to a cell isolation configuration 204 (e.g., stored as a file). The cell isolation configuration 204 includes a rated bandwidth capacity 206 of each memory host 110 in megabytes per second and a list 208 of bandwidth reservations 208a-n. Each bandwidth reservation 208a-n includes a client name, isolation class 160, and a bandwidth 150 specified in megabytes per second. In some examples, the isolation configuration 204 does not provision flex bandwidth 154, which may be any unused reserved bandwidth 152.

In some implementations, the isolation policy, as set forth by a cell isolation configuration 204, only applies to memory hosts 110 that are in danger of exceeding their rated bandwidth capacity 206. Once engaged, the isolation policy aims to distribute the bandwidth 150 of the memory host 110 fairly among the clients 120 actively accessing that memory host 110. The isolation policy may attempt to distribute bandwidth 150 evenly to active clients 120 up to the offered load of the client 120. For example, a memory host 110 with a 1 GB/s rated bandwidth capacity 206 and four active clients 120 that have offered loads of 0.1, 0.2, 0.4, and 0.8 GB/s, then a fair bandwidth distribution may be 0.1, 0.2, 0.35, and 0.35 GB/s, respectively.

In some examples, a client 120 may access an overloaded memory host 110 from multiple processes within a data center. In this case, the isolation policy distributes the fair share of bandwidth 150 of the client 120 evenly among the isolation classes 160 of the client 120 and the tasks that are actively accessing the memory host 110. In other words, each client 120 is assigned bandwidth 150 of the memory host 110, then each isolation class 160 associated with that client 120 splits the assigned bandwidth 150, and then each client request 122 within an isolation class 160 splits the isolation class bandwidth 165.

Clients 120 that need more than their fair share of bandwidth 150 of a cell 200 can reserve bandwidth 150. Bandwidth reservations 208a-n are in terms of bytes per second for the entire cell 200. A bandwidth reservation 208n is distributed evenly over all of the memory hosts 110 in the cell 200. For example, if a cell 200 has 1000 memory hosts 110 and a client 120 reserves 500 GB/s of cell bandwidth 150, then the client 120 is guaranteed to receive at least 0.5 GB/s of bandwidth 150 from each memory host 110 in the cell 200. If a client 120 does not use its reserved bandwidth 152, the memory host 110 may distribute the reserved bandwidth 152 of that client 120 to other clients 120 that can use the bandwidth 150.

Bandwidth reservations 208a-n can affect the fair share bandwidth 150 of other clients 120. Using the earlier example, in which a memory host 110 with a 1 GB/s rated bandwidth capacity 206 and four active clients 120 that have offered loads of 0.1, 0.2, 0.4, and 0.8 GB/s, if the client 120 with the 0.8 GB/s offered load reserves 0.2 GB/s of the bandwidth 150 of the memory host 110, then the pool of available flex bandwidth 154 of the memory host 110 is only 0.8 GB/s. Taking into account this bandwidth reservation 208n, the isolation policy may distribute 0.1, 0.2, 0.25, and 0.45 (0.2 reserved+0.25 flex) GB/s of bandwidth 150 to the clients 120, respectively.

When a memory host 110 detects it is above its rated bandwidth capacity 206, the memory host 110 throttles clients 120 that are using more than their share of the memory host bandwidth 150. Each client 120 may use a leaky bucket scheme to throttle its accesses to a specific memory host 110. The memory host 110 controls the fill rate of the client's leaky bucket by periodically re-computing bandwidth shares and updating the client's leaky bucket fill rate. In some examples, each client data channel has a leaky bucket with a max capacity of 128 KB, but other capacities are possible as well and may be implementation dependent. The capacity of the leaky bucket determines the maximum burst rate a client 120 can achieve. This allows their instantaneous data rate 315 to temporarily exceed their throttle rate 317. Before initiating an RDMA operation, the client 120 requests tokens from the appropriate leaky bucket. The number of requested tokens is equal to the payload size of the RDMA operation. If there are enough tokens available, the operation proceeds, if not the data channel indicates a temporary error has occurred and the operation should be retried later. The client 120 may have logic in place for handling other temporary data channel errors. The fill rate of the leaky bucket is set to the current throttle rate 317 assigned by the memory host 110.

Memory hosts 110 may also validate that clients 120 are respecting throttling requests and blacklist misbehaving clients 120 that are not respecting throttling requests. Blacklisting may be accomplished by tearing down all the RDMA connections 250 between the memory host 110 and blacklisted client 120.

The memory host 110 assigns clients 120 their reserved bandwidth 152 and their fair share of the flex bandwidth 154 of the memory host 110 as an assigned bandwidth 155. If the offered load of a client 120 is less than the assigned bandwidth 155, the unused portion of the reserved bandwidth 152 is distributed to other clients 120. Therefore, the assigned bandwidth 155 (i.e., a client's share of a memory host's bandwidth 150) changes dynamically based on the bandwidth usage of other clients 120. The assigned bandwidth share 155 may be valid for roughly 100 ms, and the memory host 110 may recompute the assigned bandwidth share 155 of a client 120 in another 100 ms.

In some implementations, an algorithm for computing the assigned bandwidth share 155 of a client 120 for a memory host 110 is:

```
int ComputeFairShareBandwidth(int rated_BW, vector users) {
    available_BW = rated_BW
    for user in users
        available_BW -= user.reserved_BW
    fair_share_users = users.size
    fair_share_BW = available_BW / fair_share_users
    sorted_users = sort users from least user.BW to most
    for user in sorted_users
        unreserved_BW = user.BW - user.reserved_BW
        if unreserved_BW < fair_share_BW
            available_BW -= unreserved_BW
            --fair_share_users
            fair_share_BW = available_BW / fair_share_users
        else
            break // Rest of the users get fair_share_BW
    return fair_share_BW
}
```

In some implementations, for isolation classes 160 and client processes 128, the memory host 110 computes the assigned bandwidth 155 for each client 120 as constrained by the rated bandwidth 206 of the memory host 110, a bandwidth 165 for each isolation class 160 as constrained by the assigned bandwidth 155 allotted to the client 120, and the bandwidth 155 for each client process 128 as constrained by the bandwidth 165 allotted to the isolation class 160 of which it is a member. In some examples, individual client requests 122 may or may not have reserved bandwidth 152.

An algorithm for computing the assigned bandwidth share 155 of a client 120 for a memory host 110 may include:

```
user_fair_share_BW = ComputeFairShareBandwidth(rated_BW, users)
for user in users:
    user.rated_BW = user.reserved_BW + user_fair_share_BW
    class_fair_share_BW = ComputeFairShareBandwidth(user.rated_BW,
user.classes)
    for class in classes:
        class.rated_BW = class.reserved_BW + class_fair_share_BW
        task_fair_share_BW = ComputeFairShareBandwidth(class.rated_BW,
class.tasks)
            task.target_throttle_rate = task_fair_share_BW
```

After computing the assigned bandwidth 155 for each client request 122, the memory hosts 110 adjusts a current throttle rate 317 for each client request 122 to approach the assigned bandwidth share 155. Since application burstiness can keep the application 124 from ever reaching its target bandwidth share 155, the memory host 110 may adjust the throttle rate 317 to account for this burstiness and to more efficiently use the memory host bandwidth 150.

After computing the client bandwidth shares 155, the memory host 110 may either perform an additive increase of the client throttle rate 317, if the measured data rate 315 of the client 120 is less than its assigned bandwidth 155, or cut the client throttle rate 317 down to the assigned bandwidth 155, if the measured data rate 315 of the client request 122 is greater than its target bandwidth share 155.

An exemplary algorithm for adjusting throttle rate 317 includes:

```
for user in users
    for class in user.classes
        for task in class.tasks
            if task.BW > task.target_bandwidth_share
                task.throttle_rate = task.target_bandwidth_share
                task.throttle_adder = 1
            else
                task.throttle_rate += task.throttle_adder
                task.throttle_rate = min(class.rated_bw, task.throttle_rate)
                task.throttle_adder *= 2
```

Memory hosts 110 may communicate throttle rates 317 to clients 120 by writing the throttle rate 317 to a local RDMA accessible memory region 114m. Clients RDMA read their throttle rate 317 from the memory region 114m, e.g., when a client 120 writes its bytes transferred 313 to the memory host 110 (i.e., after every 128 KB of data transferred). Again, this causes clients 120 that are using more bandwidth 150 and are more likely to require throttling to update their data rate 315 more frequently. The client 120 may also RDMA read the throttle rate 317 when it cannot read or write due to throttling. This read may be rate limited to once every 100 ms.

The curator(s) 210 may incorporate memory host throttling information into its/their load balancing policies, for example, to minimize throttling a client 120 due to placement of too many chunks $320n_k$ of that client 120 on a single memory host 110. The curator 210 may receive a status from each memory host 110 that includes throttling information, e.g., whether the memory host 110 is over its rated bandwidth 206 and which clients 120 are being throttled. If a client 120 is being throttled on many memory hosts 110 across a cell 200, the cell 200 may alert the client 120 that it's using too much bandwidth 150. If a client 120 is being throttled on a single memory host 110 (or a small number of memory hosts 110), the curator(s) 210 may migrate the chunks $320n_k$ of that client 120 on the overloaded memory host(s) 110 to other memory hosts 110 in the cell 200. If the condition persists, the throttling may be caused by hot chunks $320n_k$. The throttling information may be monitored to detect when the cell 200 is overloaded and whether more memory hosts 110 and bandwidth 150 need to be added to the cell 200.

Referring again to FIGS. 2A and 2C, in some implementations, the curator 210 can create, copy, resize, and delete files 310. Other operations are possible as well. To service a copy request 122cr from a client 120, the curator 210 creates a new file descriptor 300 having a state initially set to COPY_PENDING. The curator 210 may set/initialize one or more of the following fields: size, owner, group, permissions, and/or backing file. The curator 210 populates a stripes array 325 of the file descriptor 300 (FIG. 3B) with empty stripes 320n and then commits the file descriptor 300 to its file map 214. Committing this information to the file map 214 allows the curator 210 to restart a resize operation if the curator 210 crashes or a tablet containing the file system metadata 212 migrates to another curator 210. Once the curator 210 commits the file descriptor 300 to the file map 214, the curator 210 responds to the client copy request 122cr by informing the client 120 that the copy operation has been initiated. The curator 210 initiates memory-host-pull-chunk operations, which instruct memory hosts 110 to allocate a new chunk $320n_k$ and to read chunks $320n_k$ of the backing file into the memory 114 of the memory hosts 110. When a pull-chunk operation returns successfully, the curator 210 adds the new chunk $320n_k$ to the appropriate stripe 320n in the file descriptor 300. The curator 210 commits the stripe 320n with the new chunk $320n_k$ to the file map 214.

In the case of a crash or a migration, incrementally updating the file descriptors 300 allows a new curator 210 to restart a copy operation from the location the prior curator 210 stopped. This also allows clients 120 to check the status of a copy operation by retrieving the file descriptor 300 (e.g., via a lookup method) and inspecting the number of stripes 320n in the file descriptor 300 populated with chunks $320n_k$. Once all chunks $320n_k$ have been copied to the memory hosts 110, the curator 210 transitions the state of the file descriptor 300 to READ and commits it to the file map 214.

The curator 210 may maintain status information for all memory hosts 110 that are part of the cell 200. The status information may include capacity, free space, load on the memory host 110, latency of the memory host 110 from a client's point of view, and a current state. The curator 210 may obtain this information by querying the memory hosts 110 in the cell 200 directly and/or by querying a client 120 to gather latency statistics from a client's point of view. In some examples, the curator 210 uses the memory host status information to make rebalancing, draining, recovery decisions, and allocation decisions.

The curator(s) 210 may allocate chunks $320n_k$ in order to handle client requests 122 for more storage space in a file 310 and for rebalancing and recovery. The curator 210 may maintain a load map 216 of memory host load and liveliness. In some implementations, the curator 210 allocates a chunk $320n_k$ by generating a list of candidate memory hosts 110 and sends an allocate chunk request to each of the candidate memory hosts 110. If the memory host 110 is overloaded or has no available space, the memory host 110 can deny the request. In this case, the curator 210 selects a different memory host 110. Each curator 210 may continuously scan its designated portion of the file namespace, examining all the metadata 212 every minute or so. The curator 210 may use the file scan to check the integrity of the metadata 212, determine work that needs to be performed, and/or to generate statistics. The file scan may operate concurrently with other operations of the curator 210. The scan itself may not modify the metadata 212, but schedules work to be done by other components of the system and computes statistics.

The file descriptor 300 may provide the state of a file 310. A file 310 can be in one of the following states: READ, READ_WRITE, DELETED, or {CREATE, COPY, RESIZE}_PENDING. In the READ state, clients 120 can read the file 310, but not write to the file 310. Read-only files 310 are read-only for the entire life-time of the file 310, i.e., read-only files 310 are never written to directly. Instead, read-only files 310 can be copied into the file system from another file system. A backing file 310 may be used to restore data 312 when a memory host 110 crashes; consequently, the backing file 310 persists for the entire life-time of the file 310. In the READ_WRITE state, clients 120 with the appropriate permissions can read and write a mutable file's contents. Mutable files 310 support concurrent, fine grain, random writes. Random and sequential write performance may be comparable. Writes are strongly consistent; that is, if any client 120 can observe the effect of a write, then all clients 120 can observe the effect of a write. Writes can also be batched into transactions. For example, a client 120 can issue a batch of asynchronous writes followed by a sync operation. Strong consistency and transactional semantics ensure that if any client 120 can observe any write in a transaction, then all clients 120 can observe all writes in a transaction. In the DELETED state, the file 310 has been deleted. The chunks $320n_k$ belonging to the file 310 are stored in a deleted chunks field and wait for garbage collection. The {CREATE, COPY, RESIZE}_PENDING state denotes a file 310 has a create, copy, or resize operation pending on the file.

An encoding specified by a file encoding protocol buffer of the file descriptor 300 may be used for all the stripes 320a-n within a file 310. In some examples, the file encoding contains the following fields: "data chunks," which provides a number of data chunks $320n_k$ per stripe $320n$; "stripe length," which provides a number of bytes per stripe $320n$; and "sub-stripe length," which provides a number of bytes per sub-stripe. The sub-stripe length may be only valid for READ_WRITE files. The data 312 for a file 310 may be described by an array of stripe protocol buffers 325 in the file descriptor 300. Each stripe $320n$ represents a fixed region of the file's data 312, identified by an index within the array. The contents of a stripe $320n$ may include an array of chunk protocol buffers 327, each describing a chunk $320n_k$ within the stripe $320n$, including a chunk handle, an identity of the memory host 110 holding the chunk $320n_k$, and a current state of the chunk $320n_k$. For RDMA purposes, the chunk protocol buffers 327 may also store a virtual address of the chunk $320n_k$ in the memory host 110 and a client key 321 (e.g., a 32-bit key. The client key 321 is unique to a chunk $320n_k$ on a memory host 110 and is used to RDMA-read that chunk $320n_k$.

Stripes $320n$ can be further divided into sub-stripes $322n$ with associated sub-stripe metadata 324. Each sub-stripe $322n$ may include an array of sub-chunks 326a-n, each having corresponding associated sub-chunk metadata 328.

Figure 4A:
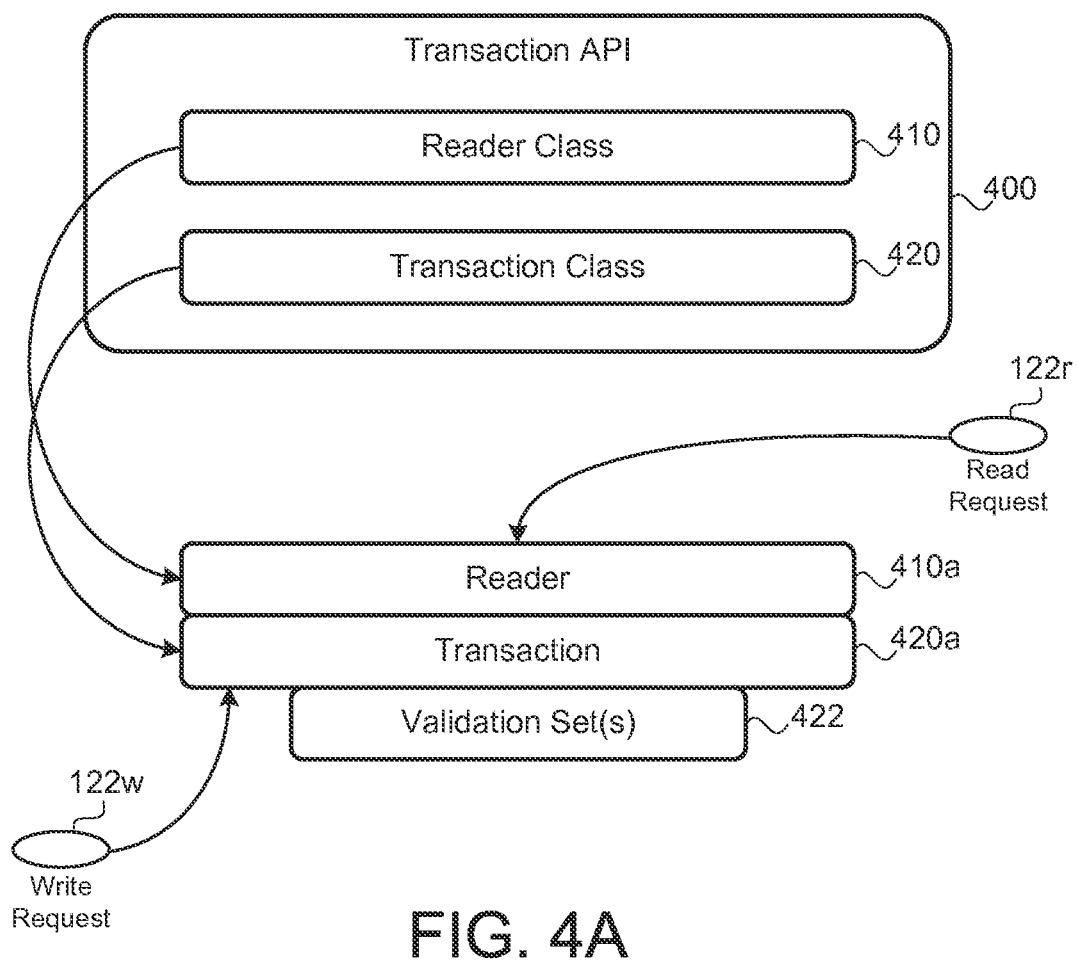
FIG. 4A is a schematic view of an exemplary application programming interface.
Figure 4B:
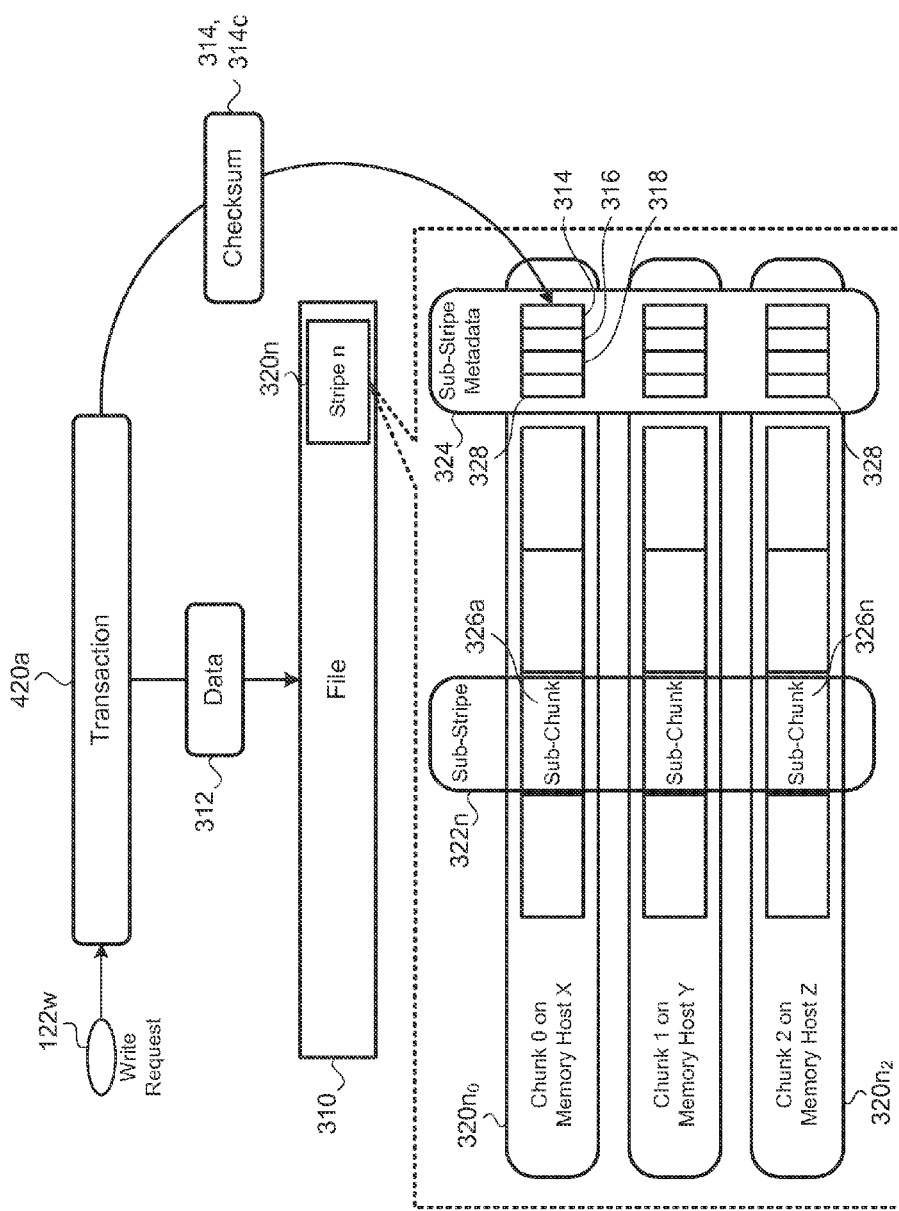
FIG. 4B is a schematic view of an exemplary transaction writing data to a file stored in a distributed storage system.
Figure 4C:
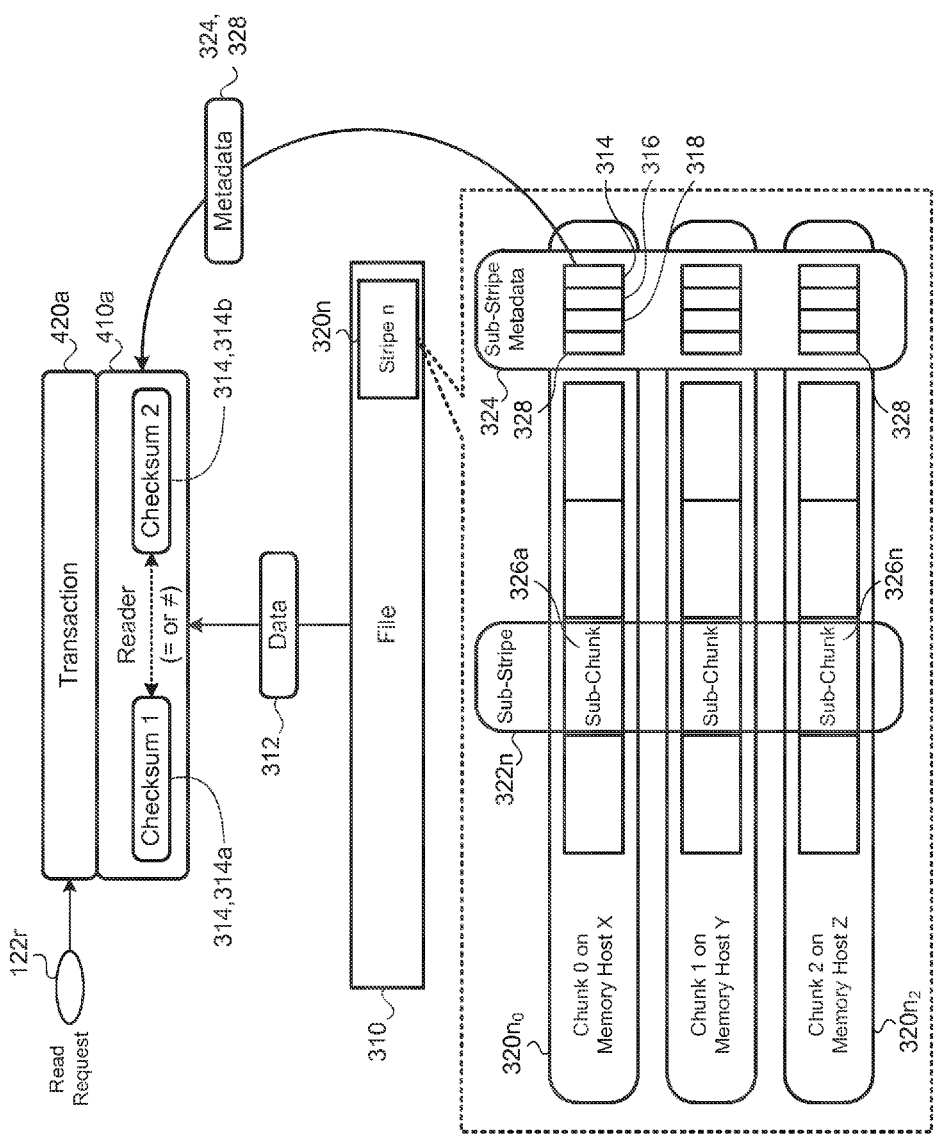
FIG. 4C is a schematic view of an exemplary transaction reading data from a file stored in a distributed storage system.

Referring to FIGS. 4A-4C, the transaction API 400 may facilitate transactions having atomicity, consistency, isolation, durability (to a degree), such that the transaction may be serializable with respect to other transactions. ACID (atomicity, consistency, isolation, durability) is a set of properties that guarantee that database transactions are processed reliably. In some implementations, the transaction API 400 includes a reader class 410 and a transaction class 420. A client 120 may instantiate a reader 410a inheriting the reader class 410 to execute a read or batches of reads on the memory hosts 110 in a cell 200. Moreover, the client 120 may instantiate a transaction 420a inheriting the transaction class 420 to execute one or more reads and/or writes. The reads and writes in a transaction 420a may be to different files 310 in a cell 200, but in some implementations, all reads and writes in a transaction must be to files 310 in the same cell 200. Executed reads may be "snapshot consistent," meaning that all reads in a transaction 420a can see a snapshot of the file 310 at a logical instant in time. Writes can be buffered until the client 120 tries to commit the transaction 420a.

Referring to FIG. 4B, in response to receiving a write memory access request 122w for a file 310, a transaction 420a may (acting as a writer) write or modify data 312 of the file 310 (e.g., of chunks $320n_k$ and/or sub-chunks 326a-n). After the write operation, the transaction 420a may compute a checksum 314 of the modified data 312 and associate the checksum 314 with the modified data 312 (e.g., with the chunks $320n_k$ and/or sub-chunks 326a-n). In some examples, the transaction 420a stores the checksum 314 in the sub-chunk metadata 328 for the modified sub-chunk 326n. The transaction 420a may execute a hash function, such as a cryptographic hash function, to compute the checksum 314. Moreover, the hash function may be configured for randomization. Each checksum 314 may be a word having at least 64 bits. A network interface controller 116 servicing the remote direct memory access requests 122 on a corresponding memory host 110 may determine the checksum 314 of any data 312 accessed on its memory host 110.

When a client 120 adds a file read request 122r to the reader 410a (e.g., via a transaction 420a), the reader 410a translates the read request 122r into a RDMA read network operation and stores a state of the network operation in memory allocated for the reader 410a. Reads that cross chunk boundaries get translated into multiple RDMA operations.

In some implementations, to translate a file read request 122r into a RDMA read network operation, the reader 410a computes a target stripe number from a file offset of the read request 122r. The reader 410a may use the stripe number to index into a chunk handle cache. The chunk handle cache returns a network channel to access the corresponding chunk $320n_k$ and a virtual address and r-key 321 of the chunk $320n_k$. The reader 410a stores the network channel and r-key 321 directly in an operation state of the RDMA read. The reader 410a uses the virtual address of the chunk $320n_k$ and the file offset to compute the virtual address within the chunk $320n_k$ to read. The reader 410a computes the offset into a memory block supplied by the client 120 (e.g., a receiving memory block for each RDMA read operation). The reader 410a may then initialize an operation status.

While buffering new reads, the reader 410a may calculate and store a running sum of the amount of metadata that will be retrieved to complete the read. This allows metadata buffer space to be allocated in one contiguous block during execution, minimizing allocation overhead.

In response to receiving a memory access request 122 from the client 120, the transaction 420a may retrieve a file descriptor 300 from the curator 210 that maps requested data chunks $320n_k$ of a file 310 on memory hosts 110 for remote direct memory access of those data chunks $320n_k$ on the memory hosts 110. The file descriptor 300 may include a client key 321 for each data chunk $320n_k$ of the file 310. Moreover, each client key 321 allows access to the corresponding data chunk $320n_k$ on its memory host 110.

Referring to FIG. 4C, in some implementations, the reader 410a executes a read operation in two phases. In the first phase, the reader 410a reads the data 312 and associated metadata 324, 328 of a file 310. In the second phase, the reader 410a validates that the data 312 read in the first phase satisfies data consistency constraints of the reader 410a. In the first phase, the reader 410a identifies one or more memory locations corresponding to the data 312 and transmits its RDMA read operations. While iterating through and transmitting RDMA reads, the reader 410a initializes and transmits RDMA reads to read sub-chunk metadata 328 and to read data 312 needed to compute checksums 314 of the sub-chunks 326a-n, such as of the first and last sub-chunks 326a, 326n in an unaligned file access. After the data 312 and metadata 328 are received, the reader 410a may check lockwords in the sub-chunk metadata 328 to ensure that the sub-chunks 326a-n were not locked while the data 312 was being read. If a sub-chunk 326a-n was locked, the reader 410a rereads the sub-chunk 326a-n and its corresponding metadata 328. Once the reader 410a finds (reads) all of the sub-chunk locks in an unlocked state, the reader 410a computes the sub-chunk checksums 314 and compares the computed checksums 314 with the checksums 314 read from the sub-chunk metadata 328.

In other words, for detecting read/write conflicts, the reader 410a, in response to receiving a read memory access request 122r for data 312 of a file 310 stored in the memory hosts 110 of a cell 200, may compute a first checksum 314a of the data 312, compare the first checksum 314a with a second checksum 314b associated with the data 312 (e.g., stored in the metadata 328 of the corresponding sub-chunk 326n), and allow a read operation on the data 312 when the first and second checksums 314a, 314b match. The reader 410a may execute a hash function, such as a cryptographic hash function, to compute the checksums 314. The reader 410a may read the data 312 and metadata 328 associated with the data 312 after receiving the read/write request 122 and before processing the read/write request 122. Moreover, the reader 410a may determine whether the data 312 was locked while reading the data 312, for example, by evaluating a lock word and/or a version number stored in the metadata 328. The reader 410a rereads the data 312 and associated metadata 328 when the data 312 was locked while previously reading the data 312.

While checksums 314 are commonly used to guard against hardware error, or even software error, using it to guard against what is actually normal operation poses certain additional requirements. Since a conflict may not be a rare event, the chance of getting a coincidentally-matching checksum can be minimized by having checksum size large enough to provide a relatively small probability of a coincidental match. In some examples, a 64-bit checksum 314 is sufficient, since checking a random bad checksum 314 every nanosecond may produce a false positive less than once every five centuries, which is much less frequent than the rates of other types of system failures. Additionally, a hash function for computing the checksum 314 may produce different numbers for all common modifications of the data 312. For example, simply adding up all the data 312 would not suffice, since a change that simply re-ordered some of the data 312 would not change the checksum 314. However, a cryptographic hash functions which, by design, does not allow simple modifications of the data 312 to produce any predictable checksum 314, may be sufficient.

A sub-chunk checksum 314 may fail a compare for one of three reasons: 1) the data 312 read was corrupted by a concurrent write; 2) the data 312 was corrupted while in transit to the client; or 3) the data 312 stored in the memory host 110 is corrupt. Cases 1 and 2 are transient errors. Transient errors are resolved by retrying the sub-chunk read. Case 3 is a permanent error that may require the client 120 to notify the curator of a corrupt sub-stripe 322n.

To differentiate between a transient error and a permanent error, the client 120 may re-read the sub-chunk data 312 and the sub-chunk metadata 328. The reader 410a then checks a sub-chunk lock-word 316 and re-computes and compares the sub-chunk checksum 314. If the checksum error still exists and a sub-chunk version number 318 has changed since the sub-chunk 326n was initially read, then the checksum compare failure was likely caused by a concurrent write so the reader 410a retries the sub-chunk read. If the version number 318 has not changed since the sub-chunk 326n was initially read, then the error is permanent and the reader 410a notifies the curator 210, and the curator 210 tries to reconstruct the data 312 of the chunk $320n_k$. If the curator 210 is unable to reconstruct the chunk data, the curator 210 replaces the old chunk $320n_k$ with a new uninitialized chunk $320n_k$.

Unlike locking, the checksum compare method for detecting read/write conflicts does not actually care if a conflicting write existed, as long as the data 312 is consistent. For example, if the data 312 is being overwritten with identical data 312, or if a write is preparing to start, but has not actually begun, or has just finished, the locking method will cause the read to fail unnecessarily, while the checksum compare will allow the read to succeed. Since the time between locking and unlocking may be much greater than the duration of an actual write, this can be a significant improvement.

The reader 410a does not know which version 318 of the data 312 it has read, and it may not matter. If it is advantageous to have the read transaction obtain a version number 318, this may be done without an additional round-trip latency penalty if the version number 318 itself is covered by the checksum 314. Although computing checksums 314 may incur a nontrivial penalty in processor time, both for the reader 410a and the writer 420a, a checksum 314 may be necessary anyway to guard against hardware errors, depending on the implementation.

Sub-chunk locks may become stuck due to a client 120 trying to execute a transaction 420a but crashing during a commit protocol of the transaction 420a. A reader 410a can detect a stuck lock by re-reading the sub-chunk lock-word 316 and version number 318. If a sub-chunk lock-word 316 and version number 318 do not change during some time out period, then the sub-chunk lock is likely stuck. When the reader 410a detects a stuck lock, it notifies the curator 210 of the stuck lock and the curator 210 recovers the sub-stripe 322n and resets the stuck lock.

Figure 4D:
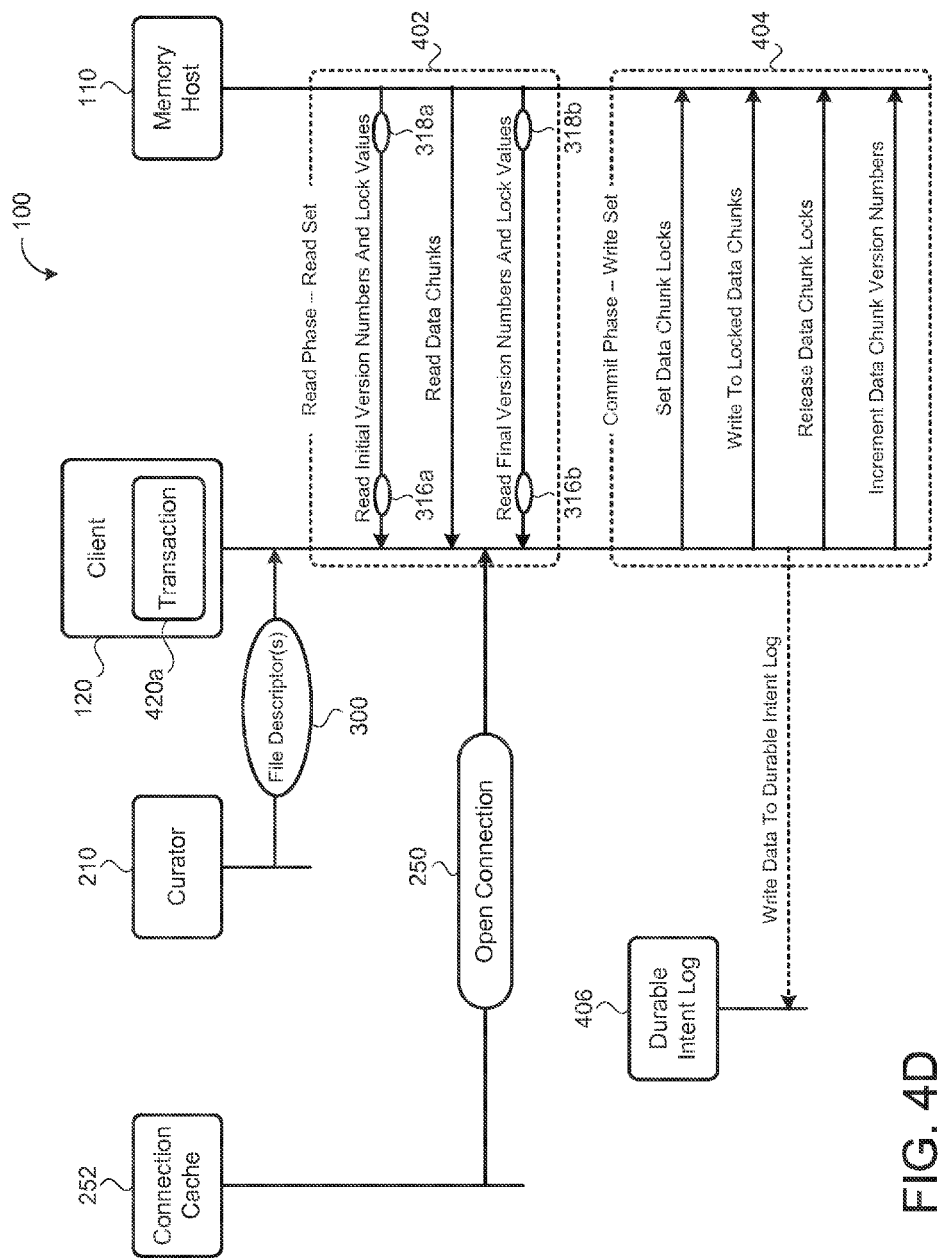
FIG. 4D is a schematic view of a client reading and writing data in an exemplary distributed storage system.

Referring also to FIGS. 4A and 4D, in some implementations, after the reader 410a validates each sub-chunk lock-word 316 and/or checksum 314, the reader 410a may proceed to the second phase of executing the read operation (i.e., the validation phase). To validate the values, the reader 410a rereads sub-chunk metadata 328 and rechecks if the sub-chunk lock-words 316 are unlocked and the sub-chunk version numbers 318 have not changed since the version numbers 318 were initially read during the first phase of the read operation. In other words, the reader 410a may read an initial version number 318a and an initial lock value 316a associated with each data chunk $320n_k$ of a read set 402 of the transaction 420a. After reading the data 312, the reader 410a reads a final version number 318b and a final lock value 316b associated with each data chunk $320n_k$ of the read set 402 and determines the read data 312 as valid when the initial version number 318a matches the final version number 318b and the initial lock value 316a matches the final lock value 316b.

If the reader 410a is associated with a transaction 420a, the reader 410a may reread the metadata 328 associated with all sub-chunks 326n read by the transaction 420a. If a single sub-chunk version number 318 mis-compares, the reader 410a returns an error. If all sub-chunk version numbers 318 are the same, the reader 410a discards the prefix and suffix of the reader memory block in order to trim extraneous data 312 read to compute the checksum 314 of the first and last sub-chunks 326a, 326n in the read. The reader 410a may set a status to OK and return to the client 120.

If the reader 410a encounters an error on a network channel while reading data 312 or metadata 212 of a chunk $320n_k$, the reader 410a may select a different chunk $320n_k$ from the chunk handle cache and notifies the curator 210 of a bad memory host. If no other good chunks $320n_k$ exist from which the reader 410a can read, the reader 410a may wait to receive a response to the error notification it sent to the curator 210. The response from the curator 210 may contain an updated file descriptor 300 that contains a new good chunk $320n_k$ to read from.

In some implementations, the transaction class 420 uses validation sets 422 to track which sub-stripes 322n have been read by the transaction 420a. Each read of a transaction 420a adds the version numbers 318 of all sub-stripes 322n read to a validation set 422 of the transaction 420a. The transaction 420a may validate the validation set 422 in two cases: 1) as part of the commit protocol and 2) the validation phase of reads of a transaction 420a. A transaction 420a may fail to commit if the commit protocol finds that any sub-stripe version number 318 differs from the number recorded in the validation set 422. Validation of the full validation set 422 before data 312 is returned to the client 120 allows early detection (e.g., before the commit phase) of a doomed transaction 420a. This validation also prevents the client 120 from getting an inconsistent view of file data 312.

A transaction 420a may provide a synchronous, serializable read operation (e.g., using a reader). In some examples, a reader 410a is instantiated and associated with the transaction 420a. Read results of the reader 410a return the latest committed data 312. As such, uncommitted writes of the same transaction 420a are not seen by a read of that transaction 420a.

A transaction 420a may buffer data 312 for a later transaction commit. The transaction class 420 translates a buffer write request into one or more 'prepare write' network operations. One network operation is needed for each stripe 320n touched by the write operation. Processing a buffer write request may involve preparing 'sub-stripe lock' network operations. One lock operation is needed for each sub-stripe 322n touched by the requested write. These operations are buffered for transmission during the transaction commit. The transaction 420a may translate buffer write requests into network operations and execute identify or coalesce writes that affect the same region of a file 310. The transaction 420a may apply write operations in the same order by the memory hosts 110 for all chunks $320n_k$ to ensure that all replicas are consistent.

The transaction 420a may provide a commit operation that results in all reads and writes in the transaction 420a being schedulable as a single atomic, serializable operation. In some implementations, the transaction commit protocol proceeds through a lock phase, a validate phase, a write phase, and an unlock phase. During the lock phase, the sub-stripe lock network operations which were created in response to buffer write requests are sent. Each sub-stripe lock operation executes an atomic compare-and-swap operation on the lock-word in all replicas $320n_k$. If the contents of the lock-word match the specified compare data 312 (e.g., a client identifier), the lock-word is written with the specified swap data 312, and the previous contents of the word are returned. If the client 120 succeeds in writing its unique client ID into the metadata lock-word, it has successfully taken the lock. If the transaction 420a fails to take the lock for any sub-stripe 322n in the write set, the commit fails and is aborted. The commit protocol proceeds to the validate phase once all sub-stripe locks are held.

During the validate phase, the transaction 420a may read the version number 318 out of the metadata 324 for all sub-stripes 322n referenced in the validation set and comparing the version numbers 318 to the version numbers 318 recorded in the validation set. If a version number 318 does not match, the sub-stripe 322n was written by another transaction 420a after it was read by this transaction 420a, so the transaction 420a fails. In this case, the reader 410a releases the locks it holds and returns a transaction conflict error to the client 120. Once all version numbers 318 in the validation set have been validated, the client 120 writes the buffered write data 312 of the transaction 420a to each replica $320n_k$ and updates the metadata 324 associated with each sub-stripe 322n written by the transaction 420a, during the write phase. Updating metadata 324 of a sub-stripe 322n may include computing and writing a new check-word 314, 316 and incrementing the version number 318 of the sub-stripe 322n. Once all data 312 and metadata 324, 328 has been updated, the transaction 420a releases the locks that it holds, during the unlock phase.

For data chunks $320n_k$ of a read set 402 of the transaction 420a, a method executing a transaction 420a may include reading data 312 of the data chunks $320n_k$ of the read set 402 through remote direct memory access and determining a validity of the read data 312 by evaluating a lock 316 and a version 318 of each data chunk $320n_k$ of the read set 402. For data chunks $320n_k$ of a write set 404 of the transaction 420a, the method may include setting locks 316 on the data chunks $320n_k$ of the write set 404, writing data 312 to the locked data chunks $320n_k$ through remote direct memory access, releasing the locks 316 of the locked data chunks 320$n_k$, and incrementing a version number 318 of each released data chunk 320$n_k$.

File transaction access may provide exclusive read/write access to the state of a file descriptor 300. Updates to the file state may be applied at the end of a transaction 420a and are atomic. File transaction access can be used for operations such as creating, finalizing, and deleting a file 310. These operations may require the curator 210 to communicate with other components such as memory hosts 110 and thus a file transaction access may last for several seconds or more. While active, the file transaction access blocks any other operations that need to modify the state of the file descriptor 300. Read access may not be blocked.

To reduce contention, stripe transaction access may provide relatively finer grain synchronization for operations that only need to modify the state of a single stripe 320n with the file descriptor 300. This mode can be used for stripe operations such as opening, closing, rebalancing, and recovering. There can be many concurrent stripe transactions for different stripes 320n within a file 310, but stripe transactions and file transactions are mutually exclusive. Within a stripe transaction, the curator 210 may examine the state of a stripe 320n and various fields of the file descriptor 300 that remain immutable for the duration of the transaction 420a, such as the file encoding and instance identifier. The stripe transaction access does not provide access to fields that can change underfoot, such as the state of other stripes 320n. Operations may hold only one active transaction 420a at a time to avoid deadlock. Moreover, transactions 420a may only atomically commit on a single file 310.

Figure 5:
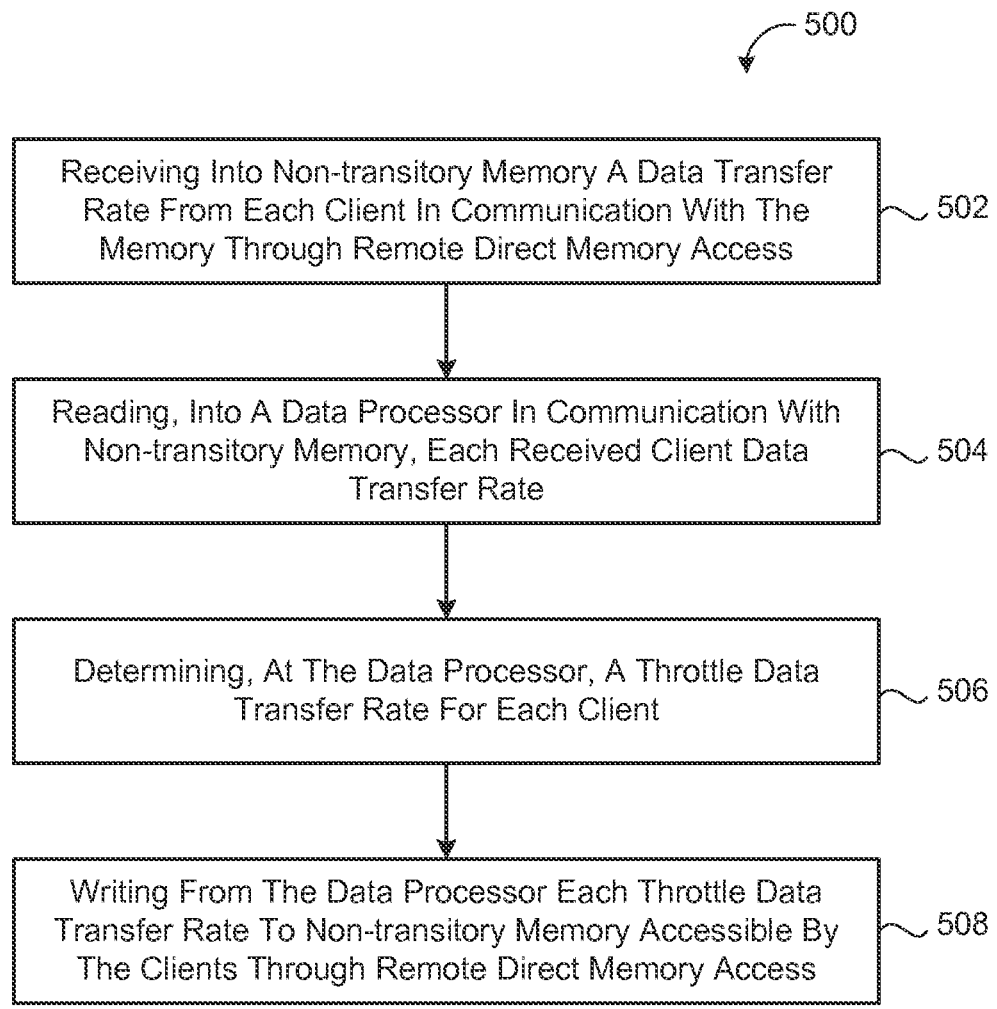
FIG. 5 is a schematic view of an exemplary arrangement of operations for a method of isolation in a distributed storage system.

FIG. 5 provides an exemplary arrangement 500 of operations for a method of isolation in a distributed storage system 100. The method includes receiving 502 into non-transitory memory 114 a data transfer rate 313 from each client 120 in communication with the memory 114 through remote direct memory access and reading 504 each received client data transfer rate 313. The method also includes determining 506 a throttle data transfer rate 317 for each client 120 and writing 508 each throttle data transfer rate 317 to non-transitory memory 114 accessible by the clients 120 through remote direct memory access.

In some implementations, the method includes, after establishing a communication connection 250 with a client 120, instantiating a first memory region 114n in the non-transitory memory 114 for receiving the data transfer rate 313 for that client 120 and a second memory region 114m in the non-transitory memory 114 for writing the throttle rate 317 for that client 120. The method may also include periodically reading the first memory region 114n for each client 120 before determining the throttle rate 317 for each client 120. The method may include registering a set of remote direct memory accessible regions 114a-n of the memory 114 with a network interface controller 116 and establishing a remote direct memory access capable connection 250 with the client 120 in response to receiving a connection request 254 from the client 120. If a client 120 fails to adhere to its corresponding throttle data transfer rate 317 over a period of time, the method may include unilaterally breaking the connection 250 with the client 120.

The method may include receiving the client data transfer rate 313 of a client 120 in the memory 114 after every transfer of a threshold amount of data between the client 120 and the memory 114. Moreover, the method may include determining the throttle data transfer rate 317 of each client 120 after receipt of a client data transfer rate 313 from any one client 120.

In some implementations, the method includes receiving an isolation configuration 204 providing a bandwidth capacity 206 for the memory host 110 and a list 208 of bandwidth reservations 208a-n for clients 120 and determining the throttle data transfer rates 317 of clients 120 based on the isolation configuration 204. Each bandwidth reservation 208a-n reserves a threshold data transfer rate for a client 120. The bandwidth capacity 206 of the memory host 110 may include reserved bandwidth 152 for servicing memory access requests 122 associated with bandwidth reservations 208a-n and flex bandwidth 154 for servicing memory access requests 122 unassociated with any bandwidth reservations 208a-n.

The step of determining the throttle data transfer rate 317 of a client 120 may include, for any associated bandwidth reservations 208a-n of the client 120, assigning reserved bandwidth 152 equal to an equally divided share of those bandwidth reservations 208a-n across the memory hosts 110 and assigning an equally divided share of flex bandwidth 154 with respect to all clients 120 in communication with the memory host 110. The step may also include determining the throttle data transfer rate 317 of a client 120 includes redistributing unused bandwidth 150 associated with one or more bandwidth reservations 208a-n of a client 120 to other clients 120.

In some implementations, the method includes associating an isolation class 160 that has one or more associated memory access requests 122 with a client 120 and determining an assigned bandwidth 155 for each client 120 based on the bandwidth capacity 206 of the memory host 110, an allotted bandwidth 150 for each isolation class 160 of each client 120 based on the assigned bandwidths 155 for each client 120, a bandwidth 150 for each memory access request 122 associated with each isolation class 160 based on the bandwidth 150 of the corresponding isolation class 160, and the throttle transfer rate 317 for each client 120 based on at least one of the assigned bandwidth 155 of the client 120, the allotted bandwidth 150 for each isolation class 160, or the bandwidth 150 for each memory access request 122.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A distributed storage system comprising:
    memory hosts, each memory host comprising:
        non-transitory memory;
        a network interface controller in communication with the non-transitory memory and servicing remote direct memory access requests from clients, the non-transitory memory receives a data transfer rate from each client in communication with the memory host through remote direct memory access; and
        a data processor in communication with the non-transitory memory and the network interface controller, the data processor executing a host process that:
            reads each received client data transfer rate;
            receives an isolation configuration providing a bandwidth capacity for the memory host and a list of bandwidth reservations for the clients, each bandwidth reservation reserving a threshold data transfer rate for a client;
            determines a throttle data transfer rate for each client based on the isolation configuration; and
            writes each throttle data transfer rate to non-transitory memory accessible by the clients through remote direct memory access.

2. The distributed storage system of claim 1, wherein after establishing a communication connection with a client, the data processor instantiates a first memory region in the non-transitory memory for receiving the data transfer rate for that client and a second memory region in the non-transitory memory for writing the throttle rate for that client.

3. The distributed storage system of claim 2, wherein the host process periodically reads the first memory region for each client before determining the throttle rate for each client.

4. The distributed storage system of claim 2, wherein the host process registers a set of remote direct memory accessible regions of the memory with the network interface controller, the host process establishing a remote direct memory access capable connection with the client in response to receiving a connection request from the client.

5. The distributed storage system of claim 4, wherein the host process unilaterally breaks the connection with a client when the client fails to adhere to its corresponding throttle data transfer rate over a period of time.

6. The distributed storage system of claim 1, wherein the memory receives the client data transfer rate of a client after every transfer of a threshold amount of data between the client and the memory host.

7. The distributed storage system of claim 6, wherein the host process determines the throttle data transfer rate of each client after receipt of a client data transfer rate from any one client.

8. The distributed storage system of claim 1, wherein the bandwidth capacity of a memory host comprises reserved bandwidth for servicing memory access requests associated with bandwidth reservations and flex bandwidth for servicing memory access requests unassociated with any bandwidth reservations.

9. The distributed storage system of claim 8, wherein determining the throttle data transfer rate of a client comprises:
    for any associated bandwidth reservations of the client, assigning reserved bandwidth equal to an equally divided share of those bandwidth reservations across the memory hosts; and
    assigning an equally divided share of flex bandwidth with respect to all clients in communication with the memory host.

10. The distributed storage system of claim 9, wherein determining the throttle data transfer rate of a client comprises redistributing unused bandwidth associated with one or more bandwidth reservations of a client to other clients.

11. The distributed storage system of claim 1, wherein the host process associates an isolation class with a client, the isolation class having one or more associated memory access requests, the host process determining:
    an assigned bandwidth for each client based on the bandwidth capacity of the memory host;
    an allotted bandwidth for each isolation class of each client based on the assigned bandwidths for each client;
    a bandwidth for each memory access request associated with each isolation class based on the bandwidth of the corresponding isolation class; and
    the throttle transfer rate for each client based on at least one of the assigned bandwidth of the client, the allotted bandwidth for each isolation class, or the bandwidth for each memory access request.

12. The distributed storage system of claim 1, further comprising a curator in communication with the memory hosts, the curator allocating memory in the memory hosts for data chunks of a file, wherein in response to a memory access request from a client in communication with the memory hosts and the curator, the curator returning a file descriptor to the client that maps data chunks of a file on the memory hosts for remote direct memory access of the data chunks on the memory hosts.

13. A distributed storage system comprising:
    memory hosts, each memory host comprising:
        non-transitory memory;
        a network interface controller in communication with the non-transitory memory and servicing remote direct memory access requests from clients, the non-transitory memory receiving a data transfer rate from each client in communication with the memory host through remote direct memory access; and
        a data processor in communication with the non-transitory memory and the network interface controller, the data processor executing a host process that:
            reads each received client data transfer rate;
            receives an isolation configuration providing a bandwidth capacity for the memory host and a list of bandwidth reservations for the clients, each bandwidth reservation reserving a threshold data transfer rate for a client;
            determines a throttle data transfer rate for each client based on the isolation configuration; and writes each throttle data transfer rate to non-transitory memory accessible by the clients through remote direct memory access; and a curator in communication with the memory hosts, the curator allocating memory in the memory hosts for data chunks of a file, wherein in response to a memory access request from a client in communication with the memory hosts and the curator, the curator returning a file descriptor to the client that maps data chunks of a file on the memory hosts for remote direct memory access of the data chunks on the memory hosts, and wherein the file descriptor comprises a client key for each data chunk of the file, the client key allowing access to the corresponding data chunk on its memory host, the curator denying access to file descriptors to clients failing to adhere to their corresponding throttle data transfer rates over a period of time.

14. A method of isolation in a distributed storage system, the method comprising:

receiving into non-transitory memory a data transfer rate from each client in communication with the memory through remote direct memory access;

reading, into a data processor in communication with non-transitory memory, each received client data transfer rate;

receiving, at the data processor, an isolation configuration providing a bandwidth capacity for the non-transitory memory and a list of bandwidth reservations for each client, each bandwidth reservation reserving a threshold data transfer rate for the corresponding client;

determining, at the data processor, a throttle data transfer rate for each client based on the isolation configuration; and writing, from the data processor, each throttle data transfer rate to non-transitory memory accessible by each client through remote direct memory access.

15. The method of claim 14, further comprising, after establishing a communication connection with a client, instantiating a first memory region in the non-transitory memory for receiving the data transfer rate for that client and a second memory region in the non-transitory memory for writing the throttle rate for that client.

16. The method of claim 15, further comprising periodically reading the first memory region for each client before determining the throttle rate for each client.

17. The method of claim 15, further comprising:

registering a set of remote direct memory accessible regions of the non-transitory memory with a network interface controller; and establishing a remote direct memory access capable connection with each client in response to receiving a connection request from each corresponding client.

18. The method of claim 17, further comprising unilaterally breaking the connection with a client when the client fails to adhere to its corresponding throttle data transfer rate over a period of time.

19. The method of claim 14, further comprising receiving the client data transfer rate of each client in the non-transitory memory after every transfer of a threshold amount of data between the corresponding client and the non-transitory memory.

20. The method of claim 19, further comprising determining the throttle data transfer rate of each client after receipt of a client data transfer rate from any one client.

21. The method of claim 14, wherein the bandwidth capacity of the non-transitory memory comprises reserved bandwidth for servicing memory access requests associated with bandwidth reservations and flex bandwidth for servicing memory access requests unassociated with any bandwidth reservations.

22. The method of claim 21, wherein determining the throttle data transfer rate of a client comprises:

for any associated bandwidth reservations of the client, assigning reserved bandwidth equal to an equally divided share of those bandwidth reservations across memory hosts of the distributed storage system; and assigning an equally divided share of flex bandwidth with respect to all clients in communication with the memory host.

23. The method of claim 22, wherein determining the throttle data transfer rate of a client comprises redistributing unused bandwidth associated with one or more bandwidth reservations of a client to other clients.

24. The method of claim 14, further comprising:

associating an isolation class with a client, the isolation class having one or more associated memory access requests;

determining an assigned bandwidth for each client based on the bandwidth capacity of the memory;

determining an allotted bandwidth for each isolation class of each client based on the assigned bandwidths for each client;

determining a bandwidth for each memory access request associated with each isolation class based on the bandwidth of the corresponding isolation class; and determining the throttle transfer rate for each client based on at least one of the assigned bandwidth of the client, the allotted bandwidth for each isolation class, or the bandwidth for each memory access request.

25. The method of claim 14, further comprising receiving a key with a client memory access request to receive access to data in the non-transitory memory.

* * * * *